(12) United States Patent
Kozaki et al.

(10) Patent No.: US 10,375,260 B2
(45) Date of Patent: Aug. 6, 2019

(54) IMAGE READING DEVICE

(71) Applicant: SEIKO EPSON CORPORATION, Tokyo (JP)

(72) Inventors: Kohei Kozaki, Matsumoto (JP); Shintaro Miyamoto, Shiojiri (JP); Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/961,240

(22) Filed: Apr. 24, 2018

(65) Prior Publication Data

US 2018/0316810 A1 Nov. 1, 2018

(30) Foreign Application Priority Data

Apr. 26, 2017 (JP) ................. 2017-086949

(51) Int. Cl.
| | |
|---|---|
| *H04N 1/00* | (2006.01) |
| *B65H 5/06* | (2006.01) |
| *B65H 29/20* | (2006.01) |
| *B65H 3/06* | (2006.01) |
| *B65H 29/12* | (2006.01) |
| *B65H 29/14* | (2006.01) |

(Continued)

(52) U.S. Cl.
CPC ....... *H04N 1/00618* (2013.01); *B65H 3/0669* (2013.01); *B65H 3/0684* (2013.01); *B65H 5/06* (2013.01); *B65H 5/062* (2013.01); *B65H 29/125* (2013.01); *B65H 29/14* (2013.01); *B65H 29/20* (2013.01); *B65H 31/02* (2013.01); *H04N 1/00602* (2013.01); *H04N 1/00652* (2013.01); *H04N 1/00798* (2013.01); *B65H 2301/4212* (2013.01); *B65H 2403/42* (2013.01); *B65H 2403/43* (2013.01); *B65H 2403/73* (2013.01); *B65H 2404/6111* (2013.01); *B65H 2405/11151* (2013.01)

(58) Field of Classification Search
None
See application file for complete search history.

(56) References Cited

U.S. PATENT DOCUMENTS

| | | | |
|---|---|---|---|
| 9,388,004 B2 | 7/2016 | Naniwa | |
| 2014/0291917 A1* | 10/2014 | Uchino | B65H 1/02 271/147 |

(Continued)

FOREIGN PATENT DOCUMENTS

JP 2015-140255 A 8/2015

*Primary Examiner* — Dov Popovici
(74) *Attorney, Agent, or Firm* — Workman Nydegger

(57) ABSTRACT

There is provided an image reading device including a power transmission unit that transmits power of a driving source to a transportation roller and a discharging roller, in which the power transmission unit is configured to include a first gear group that constitutes a first power transmission route and a second gear group that constitutes a second power transmission route and that is configured to include a smaller number of gears than the first gear group, the second gear group includes a transportation roller driving gear and is disposed inside a curved inversion route as seen from an axial direction of a rotation shaft, and at least a portion of the transportation roller driving gear is positioned inside a medium transportation region in a width direction of a medium.

7 Claims, 19 Drawing Sheets

(51) Int. Cl.
 _B65H 31/02_ (2006.01)
 _G06F 3/12_ (2006.01)

(56) References Cited

U.S. PATENT DOCUMENTS

2014/0292971 A1\* 10/2014 Uchino .................. B41J 13/103
                                                347/104
2018/0312351 A1\* 11/2018 Yamada ................... B65H 1/04
2019/0020778 A1\* 1/2019 Miyamoto ......... H04N 1/00628

\* cited by examiner

IMAGE READING DEVICE

BACKGROUND

1. Technical Field

The present invention relates to an image reading device that reads a surface of a medium.

2. Related Art

As a scanner which is an example of an image reading device, there is a scanner that is provided with an automatic document feeding device (also referred to as an auto document feeder (ADF)) and is configured to be capable of automatically feeding and reading a plurality of documents. As a configuration of the automatic document feeding device, there is a configuration in which a document is fed from a document supporting portion which supports the document, is transported to a reading position after being inverted in a U-shape, and is discharged toward a discharge tray after being read.

In JP-A-2015-140255, an example of a scanner that is provided with such an automatic document feeding device is described.

There is a case where a number of rollers are provided in a document transportation path in an automatic document feeding device and a plurality of gears are disposed on a side portion of the document transportation path in order to drive the plurality of rollers with a driving source.

Here, the transportation accuracy of a transportation roller, which is one of the plurality of rollers and which accurately transmits a document to a reader, needs to be high. However, a backlash of a gear or distortion or the like of a rotation shaft causes a decrease in document transportation accuracy of the transportation roller.

In order to decrease the influence of the backlash of the gear, it is preferable that the gear have a large diameter. However, when only the diameter of the gear is increased, the size of the device is increased.

SUMMARY

An advantage of some aspects of the invention is to provide an image reading device configured in consideration of both of improvement in transportation accuracy of a transportation roller that accurately feeds a document to a reader and suppression of an increase in size of the device.

According to an aspect of the invention, there is provided an image reading device including a medium supporting portion that supports a medium to be fed, a curved inversion route in which the medium fed from the medium supporting portion is curved and inverted, a reader that reads the medium having passed through the curved inversion route, a transportation roller that is disposed in the curved inversion route and transports the medium to the reader, a discharging roller that is provided on a downstream side of the reader and discharges the medium read by the reader, and a power transmission unit that transmits power of a driving source to the transportation roller and the discharging roller, in which the power transmission unit is configured to include a plurality of gears, the plurality of gears include an input gear that is provided at a branching position at which a power transmission route branches into a first power transmission route toward the discharging roller side and a second power transmission route toward the transportation roller side and that transmits the power of the driving source to the first power transmission route and the second power transmission route, a first gear group that constitutes the first power transmission route, and a second gear group that constitutes the second power transmission route and that is configured to include a smaller number of gears than the first gear group, the second gear group includes a transportation roller driving gear that is provided on a rotation shaft of the transportation roller and is disposed inside the curved inversion route as seen from an axial direction of the rotation shaft, and at least a portion of the transportation roller driving gear is positioned inside a medium transportation region in a width direction of the medium.

According to this configuration, since the second gear group that transmits the power from the input gear driven by the driving source to the transportation roller is configured to include a smaller number of gears than the first gear group that transmits the power from the input gear to the discharging roller in a configuration in which the power of the driving source is transmitted to the transportation roller and the discharging roller by means of the power transmission unit, it is possible to make the influence of backlashes of gears at the time of driving the transportation roller smaller than that of the discharging roller and to prioritize the transportation accuracy of the transportation roller of which the influence on the reading accuracy is great.

In addition, at least a portion of the transportation roller driving gear provided on the rotation shaft of the transportation roller is positioned inside the medium transportation region. Accordingly, a distance between a position from which a torque is transmitted with respect to the rotation shaft of the transportation roller and the transportation roller is shortened and thus it is possible to suppress distortion of the rotation shaft and to suppress a decrease in transportation accuracy of the transportation roller.

Furthermore, the second gear group that can transmit a drive power to the transportation roller is disposed inside the curved inversion route, that is, second gear group is disposed by using a space inside the curved inversion route of which a relatively large space can be used. Therefore, it is possible to avoid an increase in size of the device even when the outer diameters of the gears are secured in order to suppress the influence of backlashes of the gears.

Accordingly, it is possible to provide the image reading device configured in consideration of both of improvement in transportation accuracy of the transportation roller and suppression of an increase in size of the device.

The image reading device may further include a feeding roller that feeds the medium from the medium supporting portion, and the power of the driving source may be transmitted to the feeding roller through the first power transmission route.

According to this configuration, the effect of the above-described configuration can be achieved in a configuration in which the feeding roller that feeds the medium from the medium supporting portion is provided and the power of the driving source is transmitted to the feeding roller through the first power transmission route.

In the image reading device, the first gear group may be positioned outside a medium transportation route in a width direction of the medium.

According to this configuration, since the first gear group is positioned outside the medium transportation route in the width direction of the medium, it is possible to secure the diameters of gears constituting the first gear group and to suppress a decrease in transportation accuracy which is caused by backlashes of the gears.

In the image reading device, the rotation shaft of the transportation roller may be shorter than a rotation shaft of the discharging roller.

According to this configuration, the effect of any one of the above-described configurations can be achieved in a configuration in which the rotation shaft of the transportation roller is shorter than the rotation shaft of the discharging roller.

The image reading device may further include a route forming member that forms the curved inversion route and supports the first gear group and the second gear group with a side portion. A recess portion may be formed in the side portion of the route forming member and the recess portion may be provided with the second gear group.

According to this configuration, the effect of any one of the above-described configurations can be achieved in a configuration in which the recess portion is formed in the side portion of the route forming member and the recess portion is provided with the second gear group.

The image reading device may further include a cover member that covers the input gear and at least a portion of the first gear group. The route forming member may be provided with a shaft portion that supports the input gear and the cover member may be provided with a shaft supporting portion that supports a free end of the shaft portion.

According to this configuration, since the image reading device is provided with the cover member that covers the input gear and at least a portion of the first gear group, it is possible to restrain a user from touching the gears carelessly. Furthermore, since the cover member is provided with the shaft supporting portion that supports the free end of the shaft portion supporting the input gear, it is possible to appropriately support the input gear by suppressing deformation of the shaft portion.

The image reading device may further include a device main body that is provided with a mounting table on which the document is mounted and the reader and a document transportation device that is provided to be opened and closed with respect to the device main body and that transports the document to a reading region on the mounting table. The medium supporting portion, the curved inversion route, the transportation roller, the discharging roller, and the power transmission unit may constitute the document transportation device, the driving source may be provided in the device main body and may be used as a driving source for moving the reader with respect to the mounting table, and a transmission route of a drive power from the driving source to the power transmission unit may be formed in a state where the document transportation device is closed with respect to the device main body.

According to this configuration, since the driving source is used for the purpose of driving the document transportation device and the purpose of driving the reader, it is possible to reduce the cost of the device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to drawings. Note that, the same component in each example will be given the same reference symbol, the description thereof will be made only in the first example, and the description of the component will be omitted in the subsequent examples.

Figure 1:
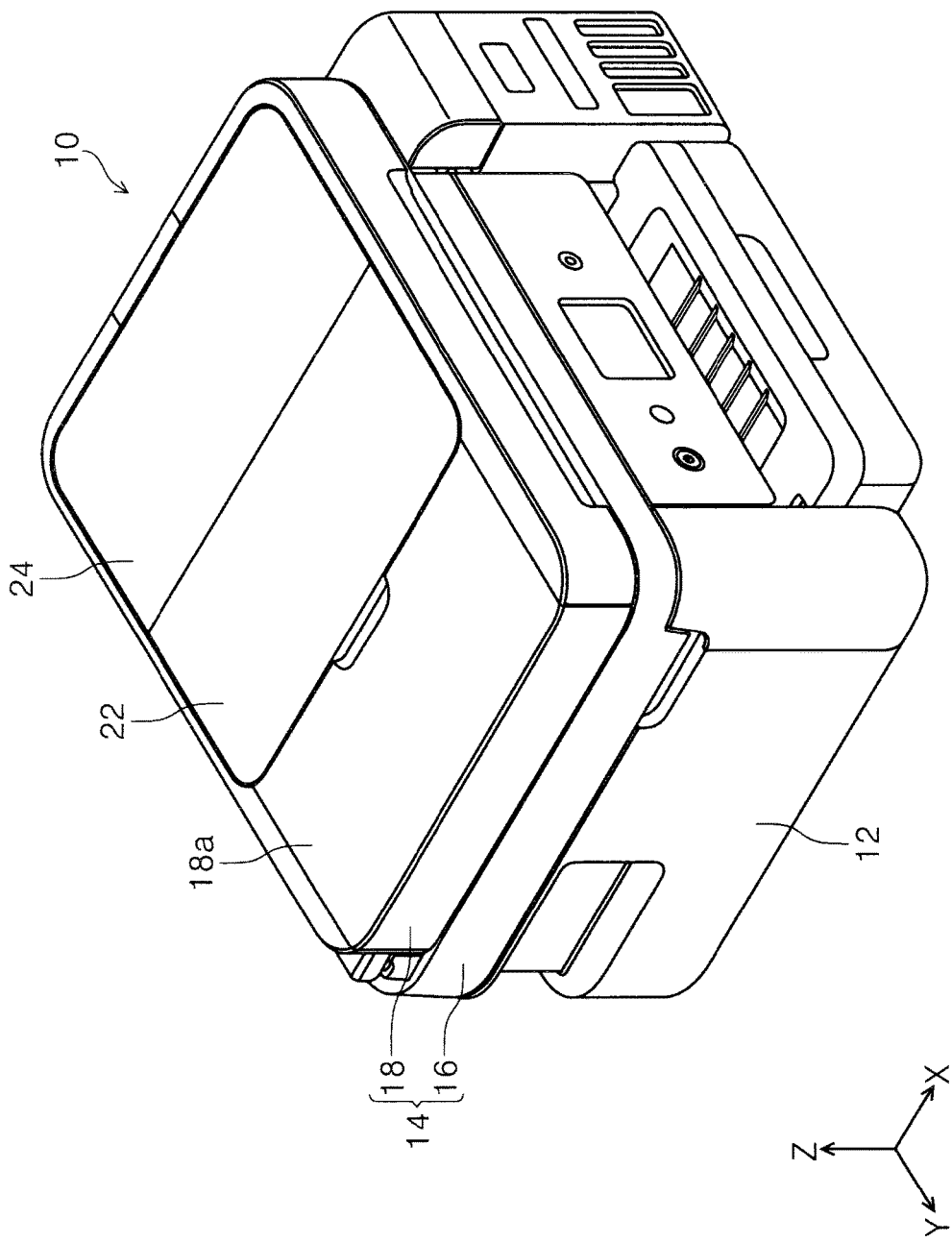
FIG. 1 is a perspective view illustrating the external appearance of a printer according to the invention.
Figure 2:
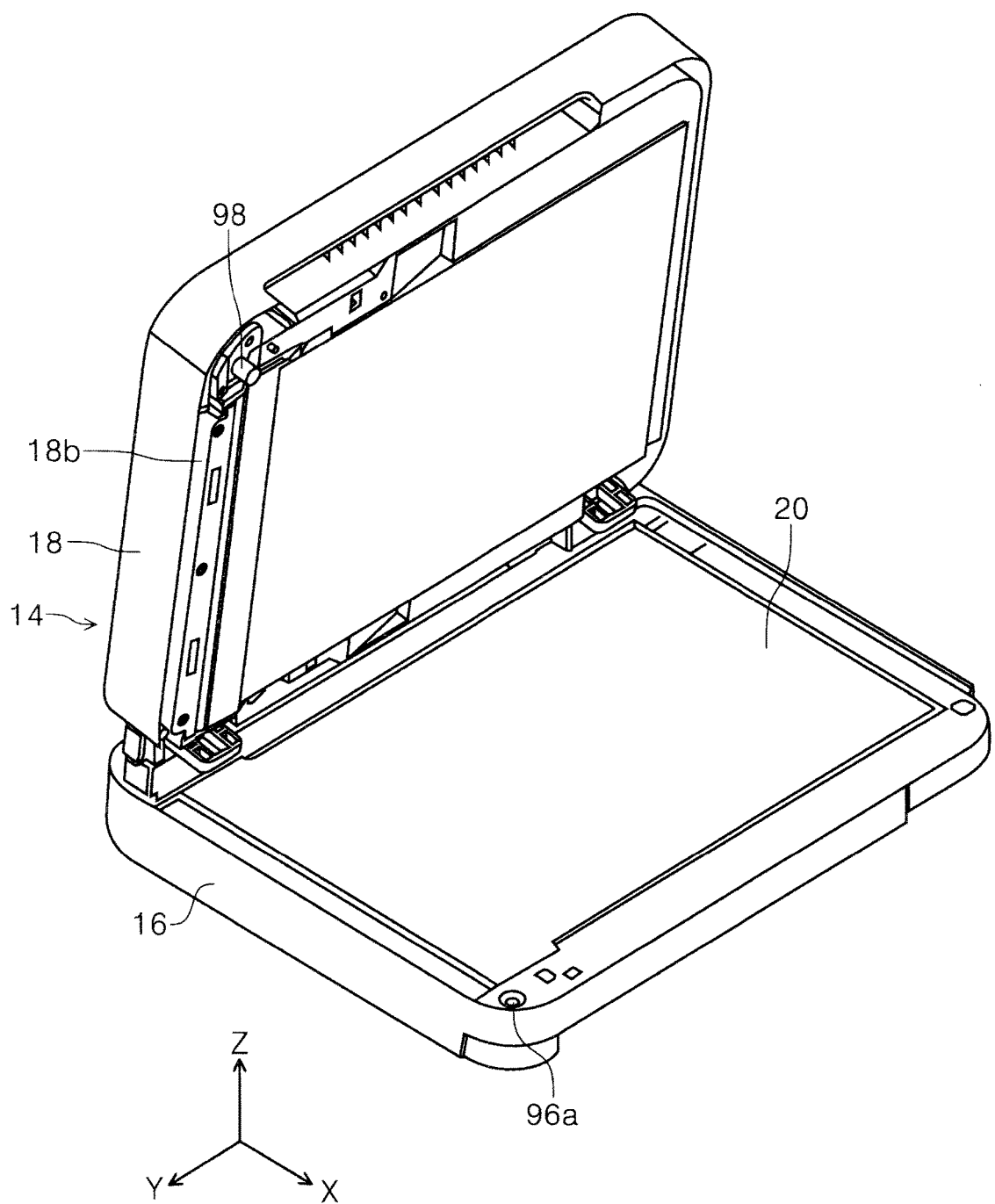
FIG. 2 is a perspective view illustrating a state where a document transportation device in the image reading device according to the invention is open with respect to a device main body.
Figure 3:
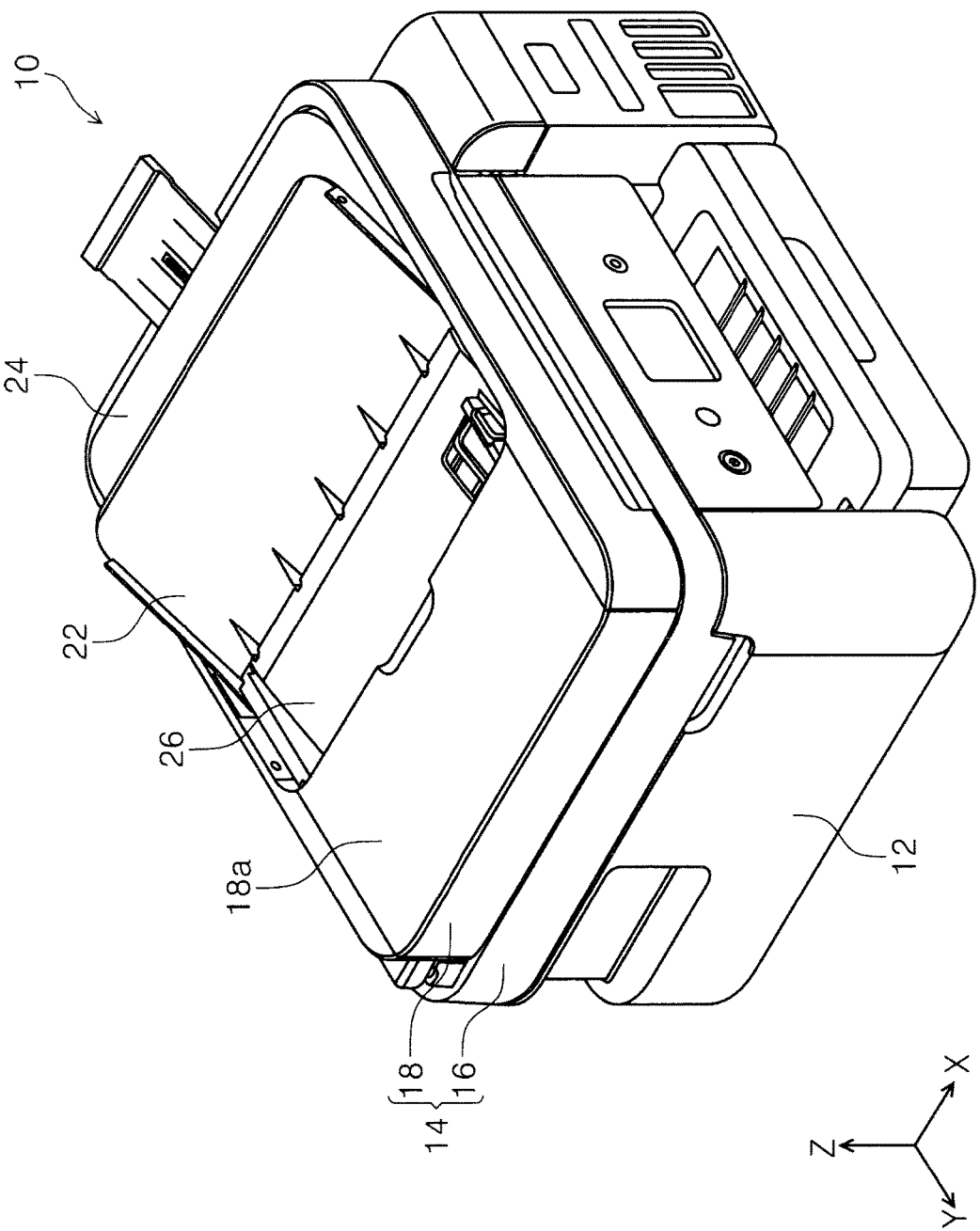
FIG. 3 is a perspective view illustrating a document feedable state of the document transportation device in the printer.
Figure 4:
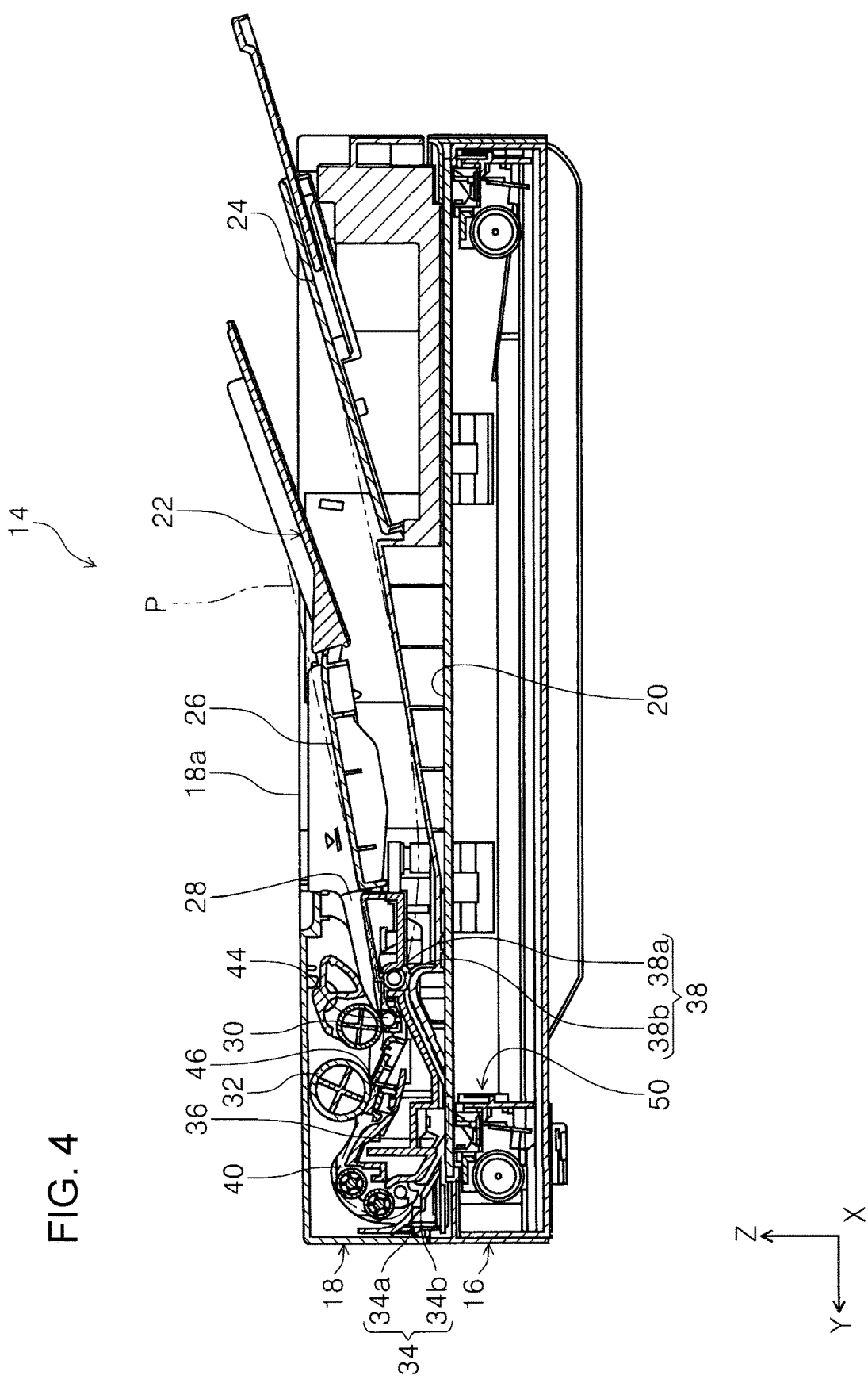
FIG. 4 is a side sectional view illustrating a transportation route of a document in the image reading device and the document transportation device.
Figure 5:
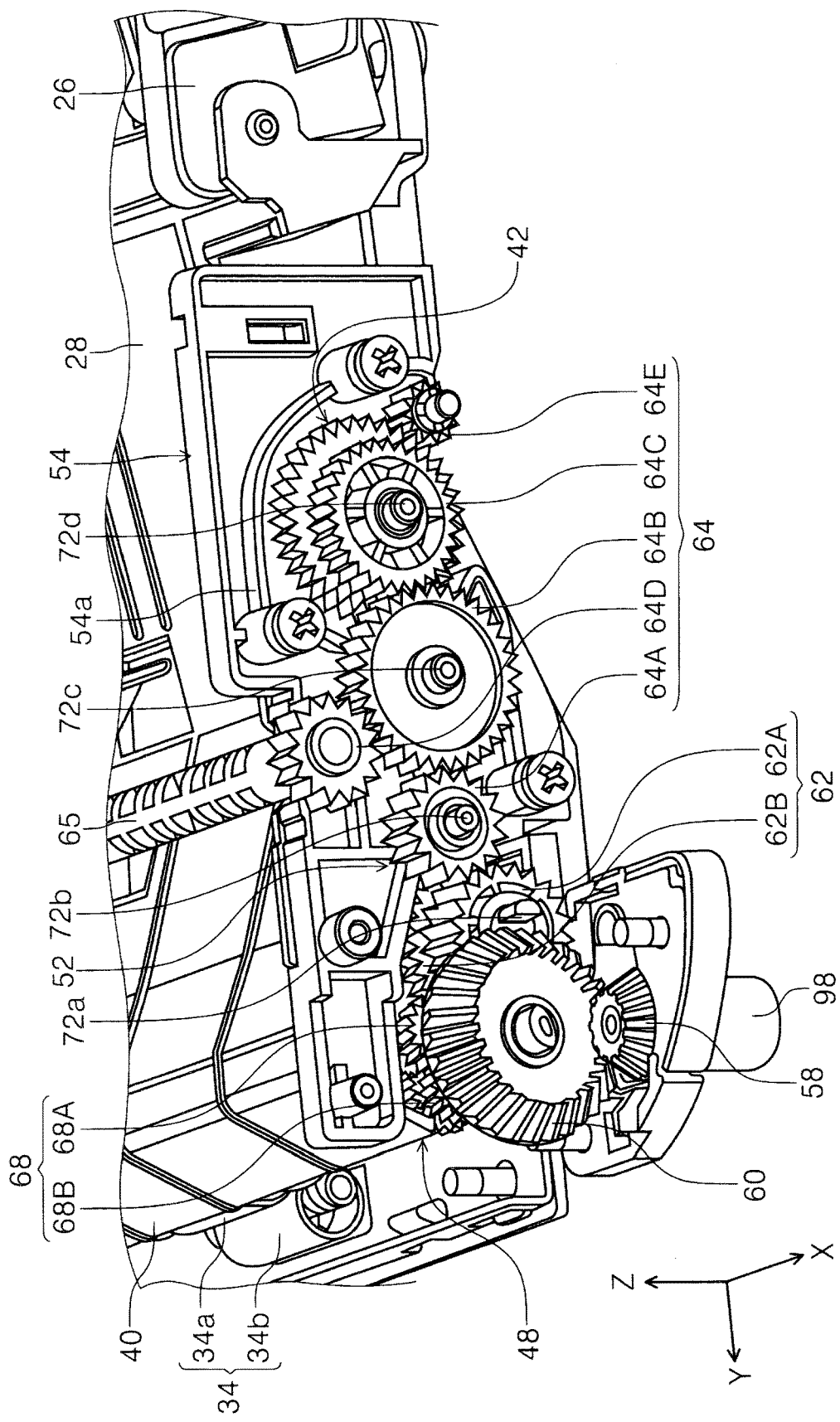
FIG. 5 is a perspective view illustrating a power transmission unit in the document transportation device.

FIG. 1 is a perspective view illustrating the external appearance of a printer according to the invention, FIG. 2 is a perspective view illustrating a state where a document transportation device in an image reading device according to the invention is open with respect to a device main body, FIG. 3 is a perspective view illustrating a document feedable state of the document transportation device in the printer, FIG. 4 is a side sectional view illustrating a transportation route of a document in the image reading device and the document transportation device, and FIG. 5 is a perspective view illustrating a power transmission unit in the document transportation device.

Figure 6:
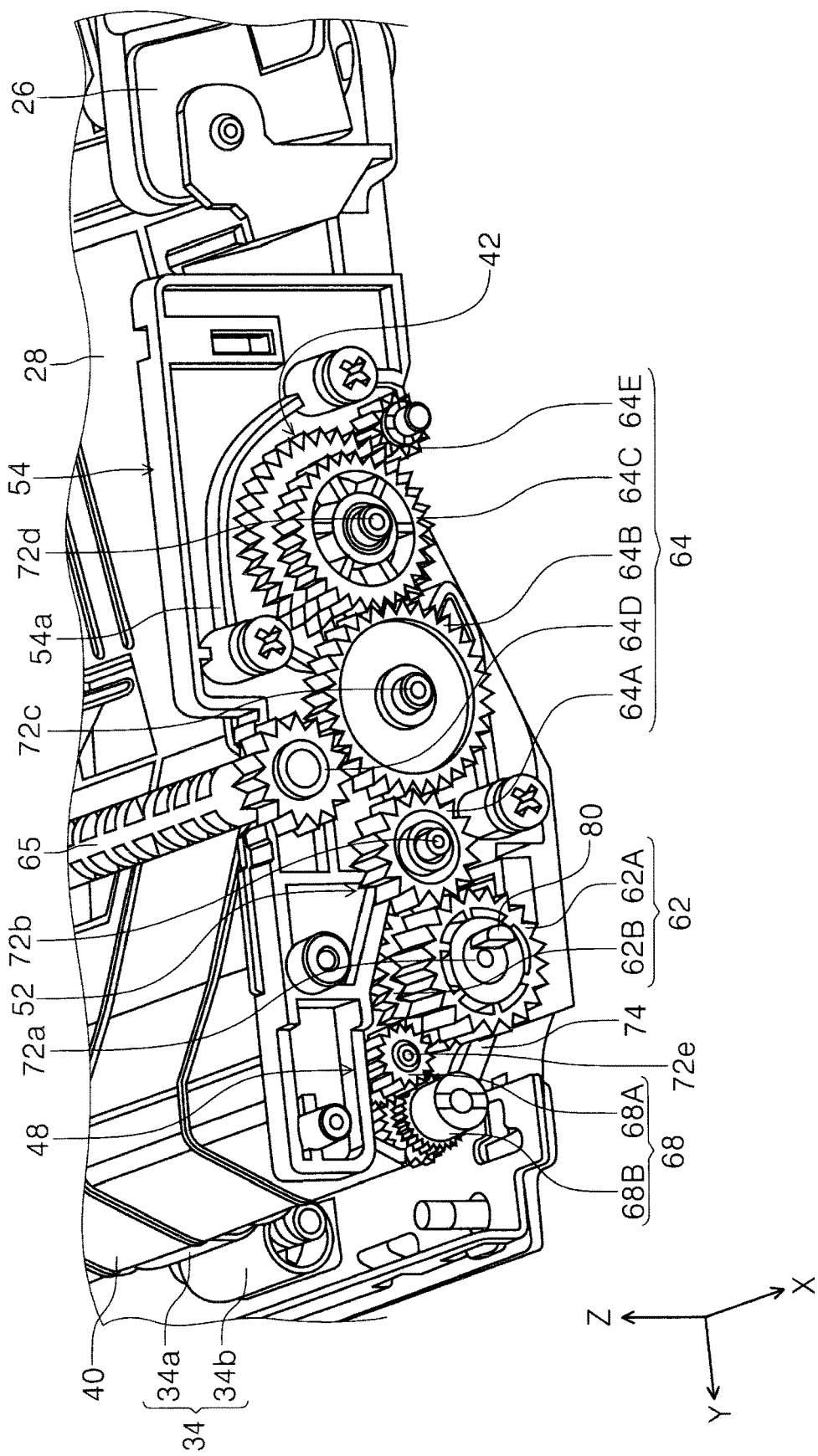
FIG. 6 is a perspective view illustrating a first power transmission route and a second power transmission route.
Figure 7:
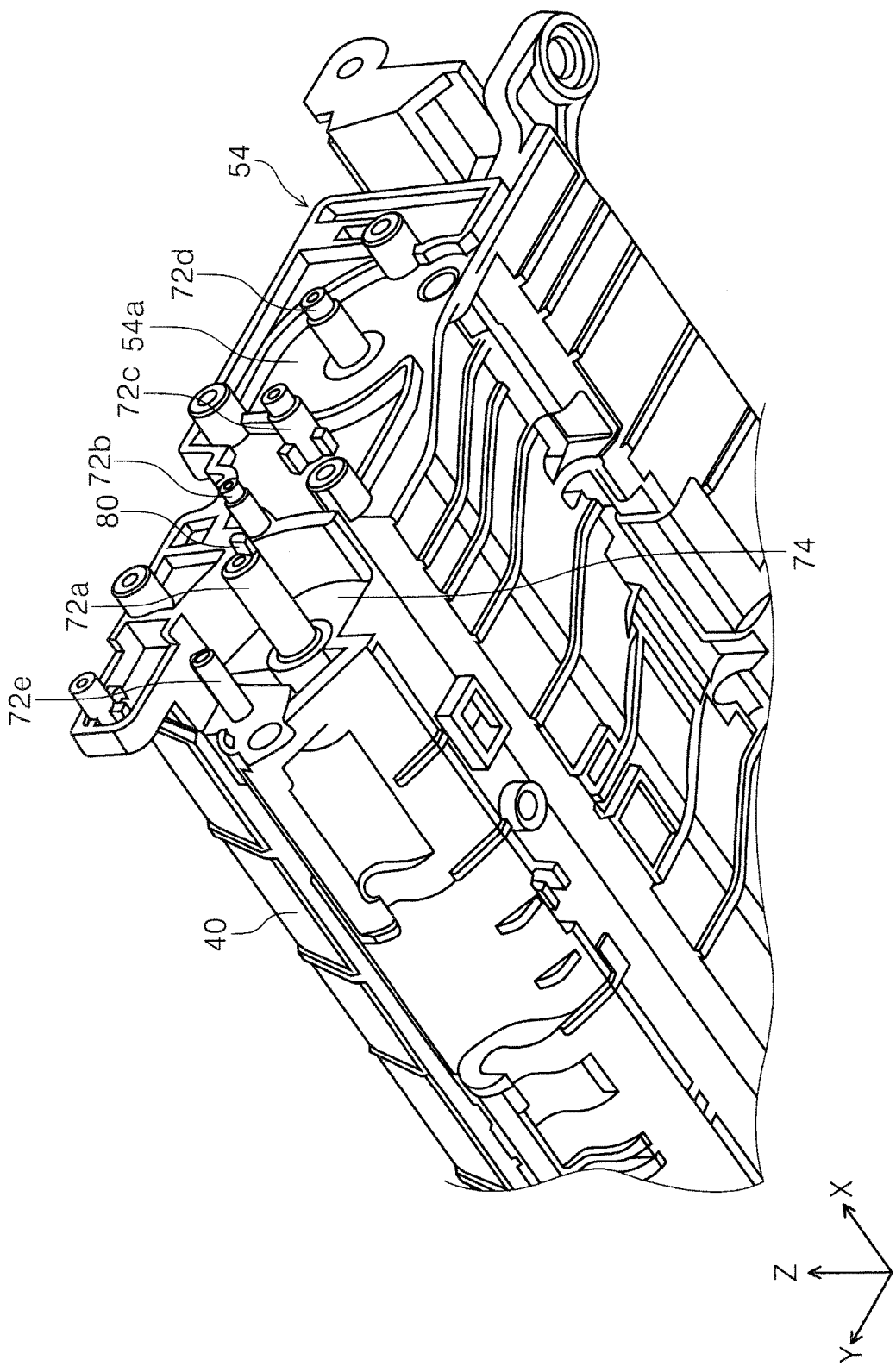
FIG. 7 is a perspective view illustrating a recess portion provided in a side portion of a route forming member of the document transportation device.
Figure 8:
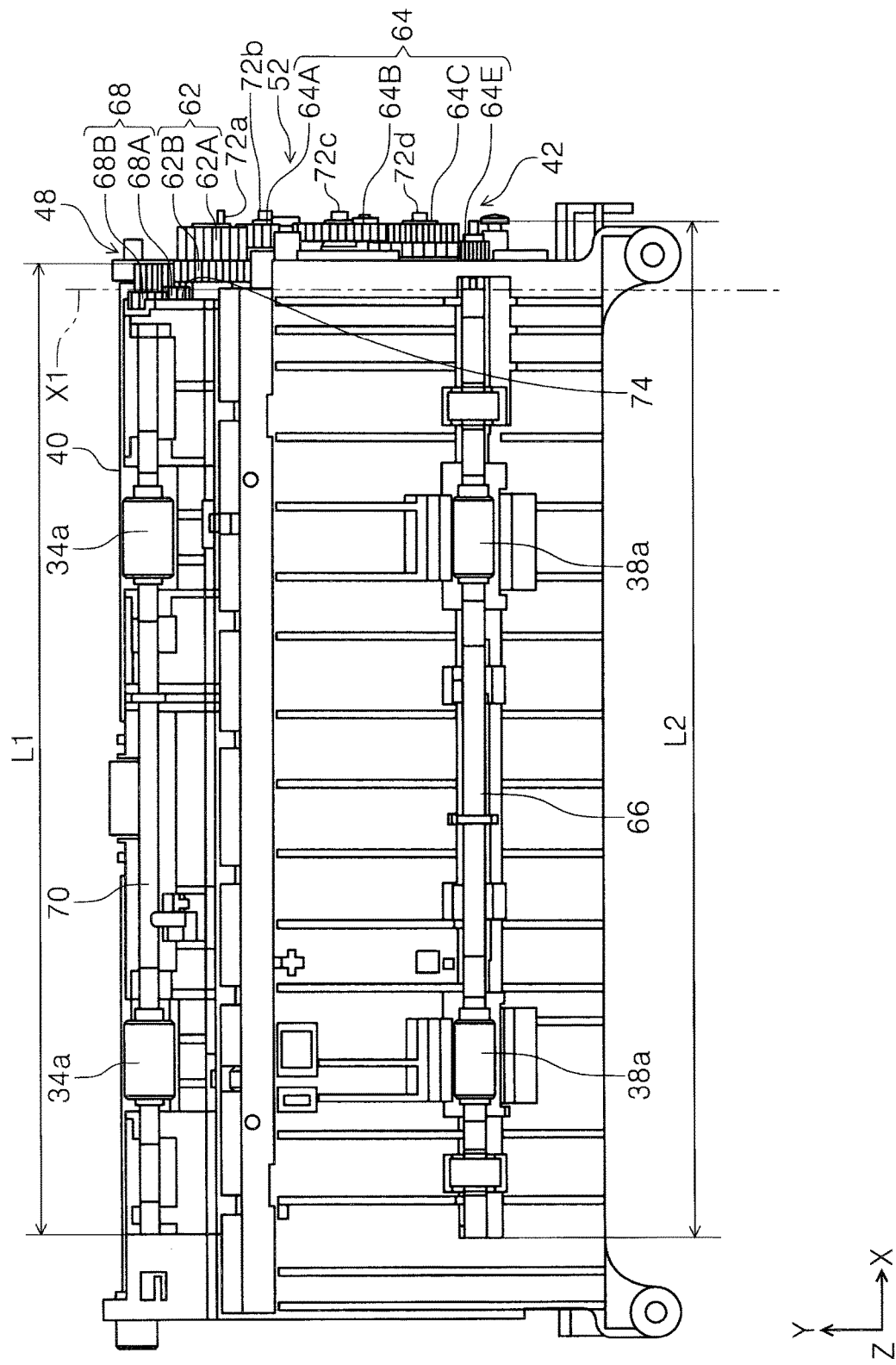
FIG. 8 is a plan view illustrating a lower surface of the route forming member.
Figure 9:
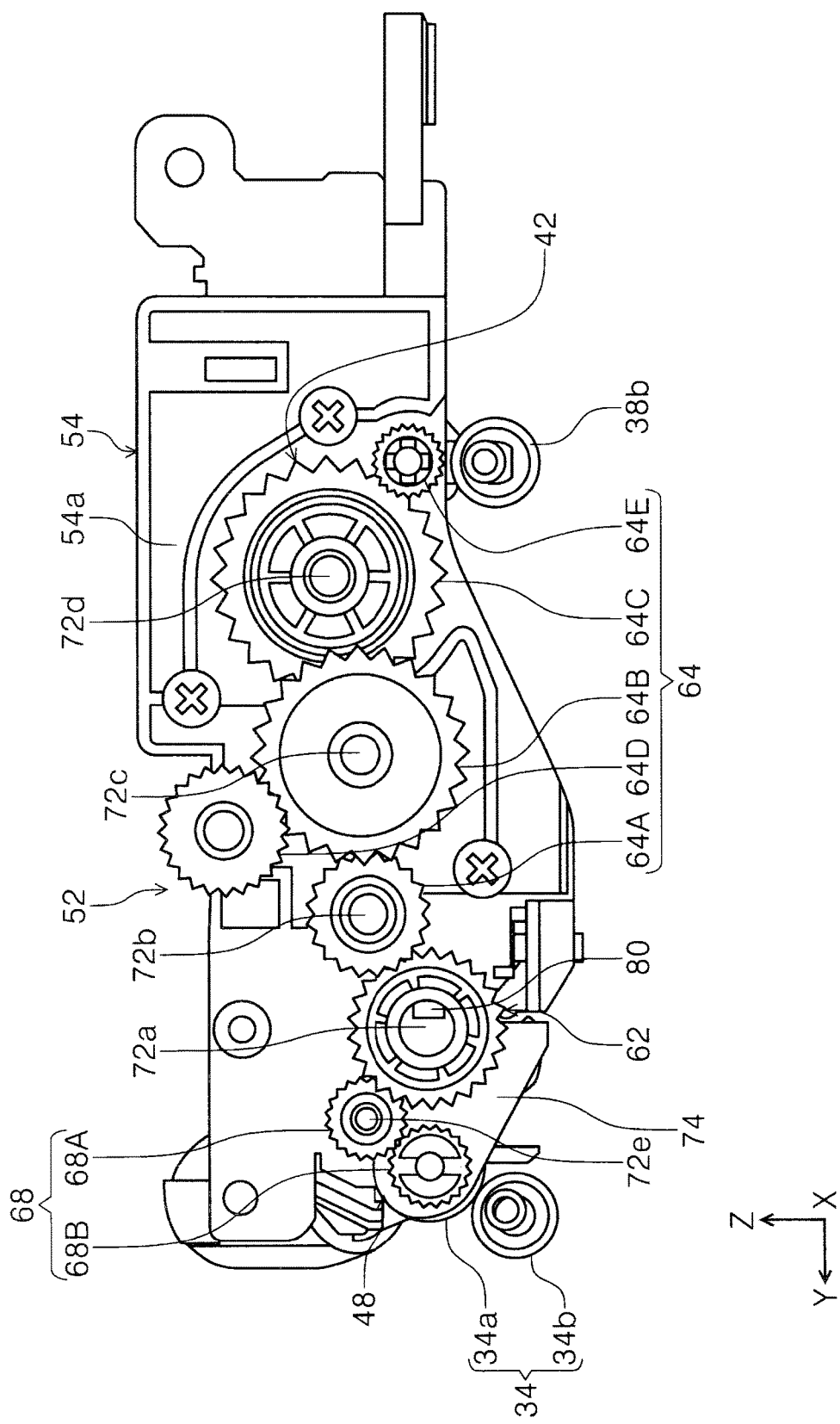
FIG. 9 is a side view illustrating the route forming member and the power transmission unit.
Figure 10:
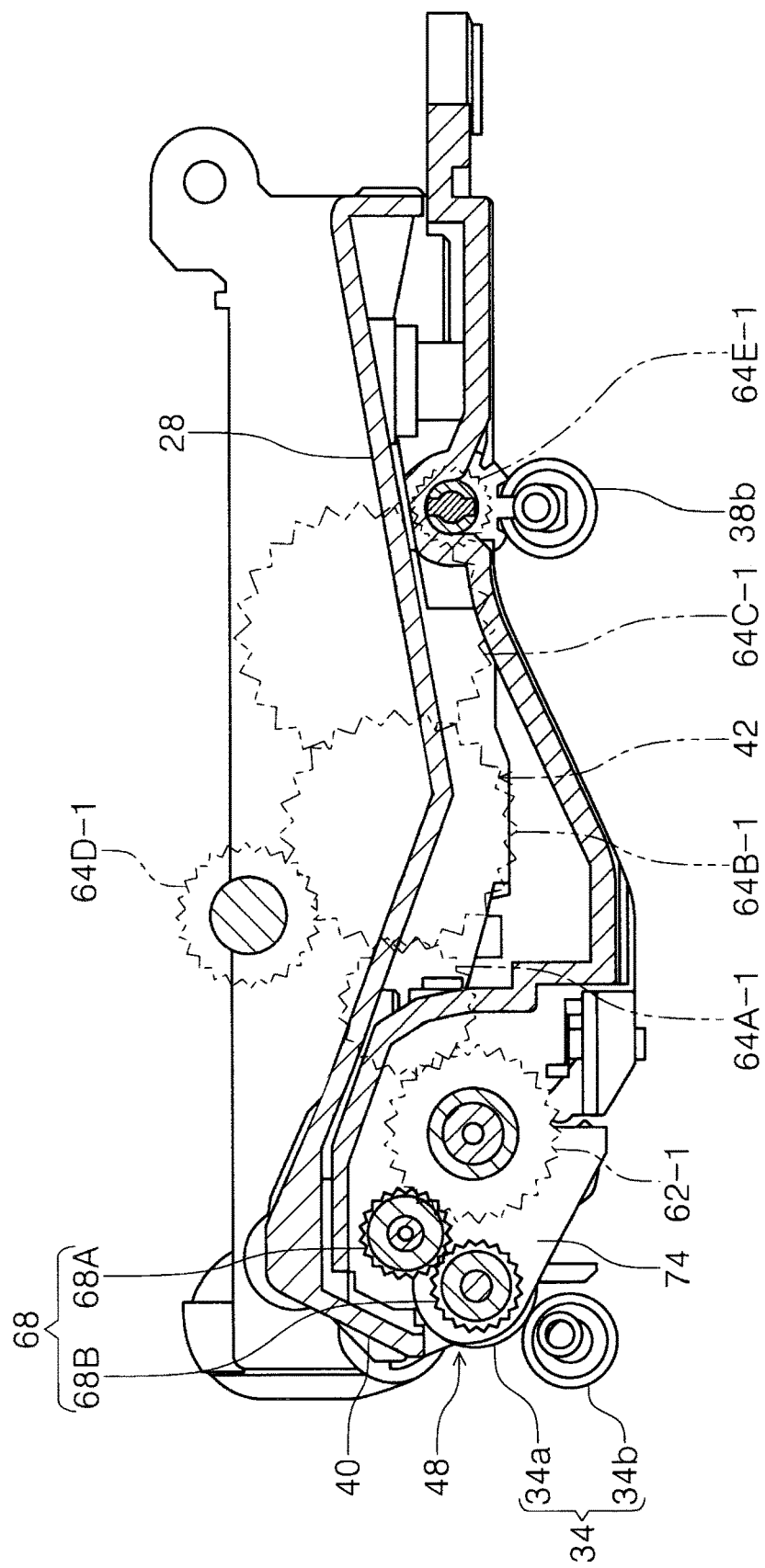
FIG. 10 is a side sectional view illustrating a curved inversion route in the route forming member.

FIG. 6 is a perspective view illustrating a first power transmission route and a second power transmission route, FIG. 7 is a perspective view illustrating a recess portion provided in a side portion of a route forming member of the document transportation device, FIG. 8 is a plan view illustrating a lower surface of the route forming member, FIG. 9 is a side view illustrating the route forming member and the power transmission unit, and FIG. 10 is a side sectional view illustrating a curved inversion route in the route forming member.

Figure 11:
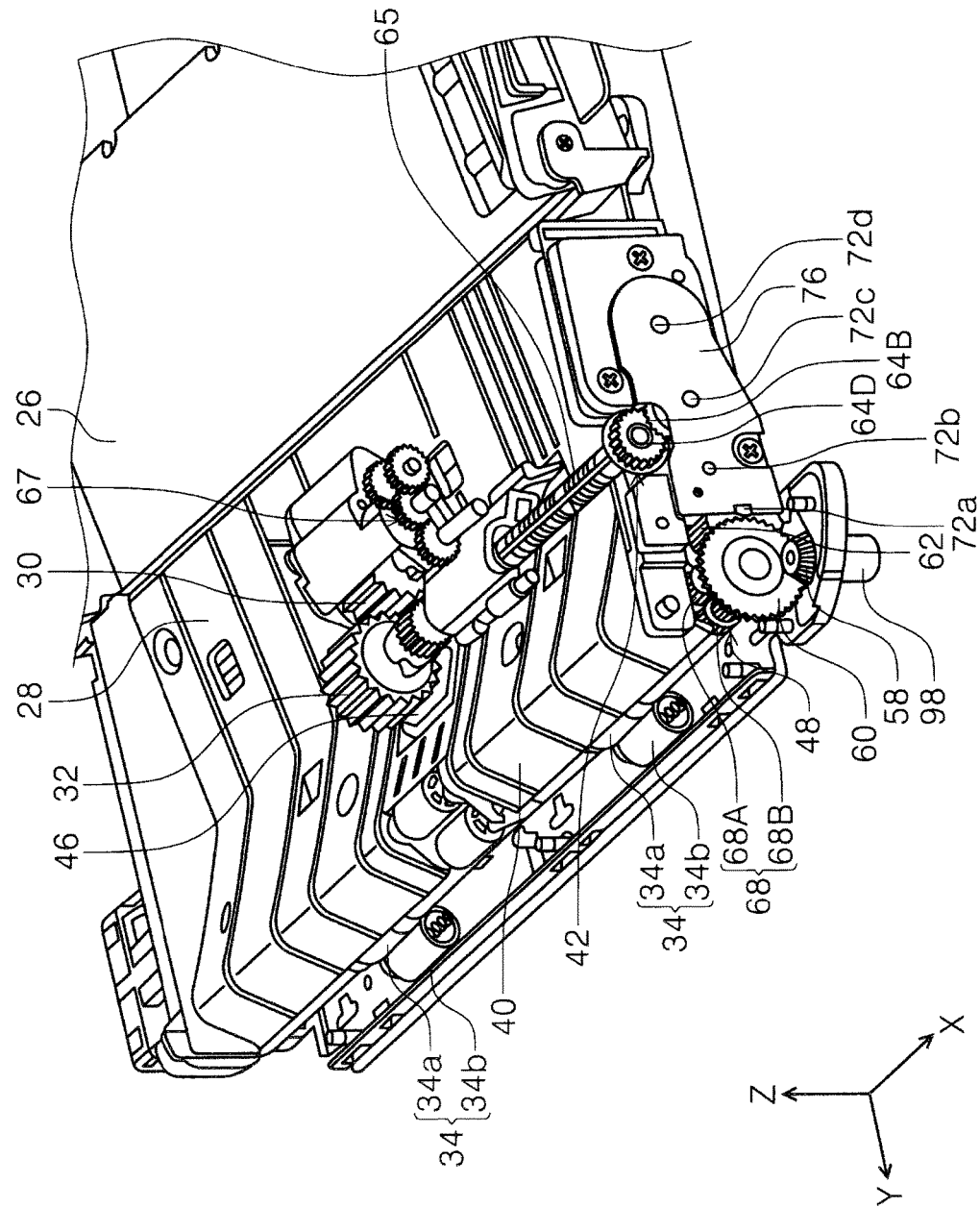
FIG. 11 is a perspective view illustrating a cover member that covers a first gear group in the route forming member.
Figure 12:
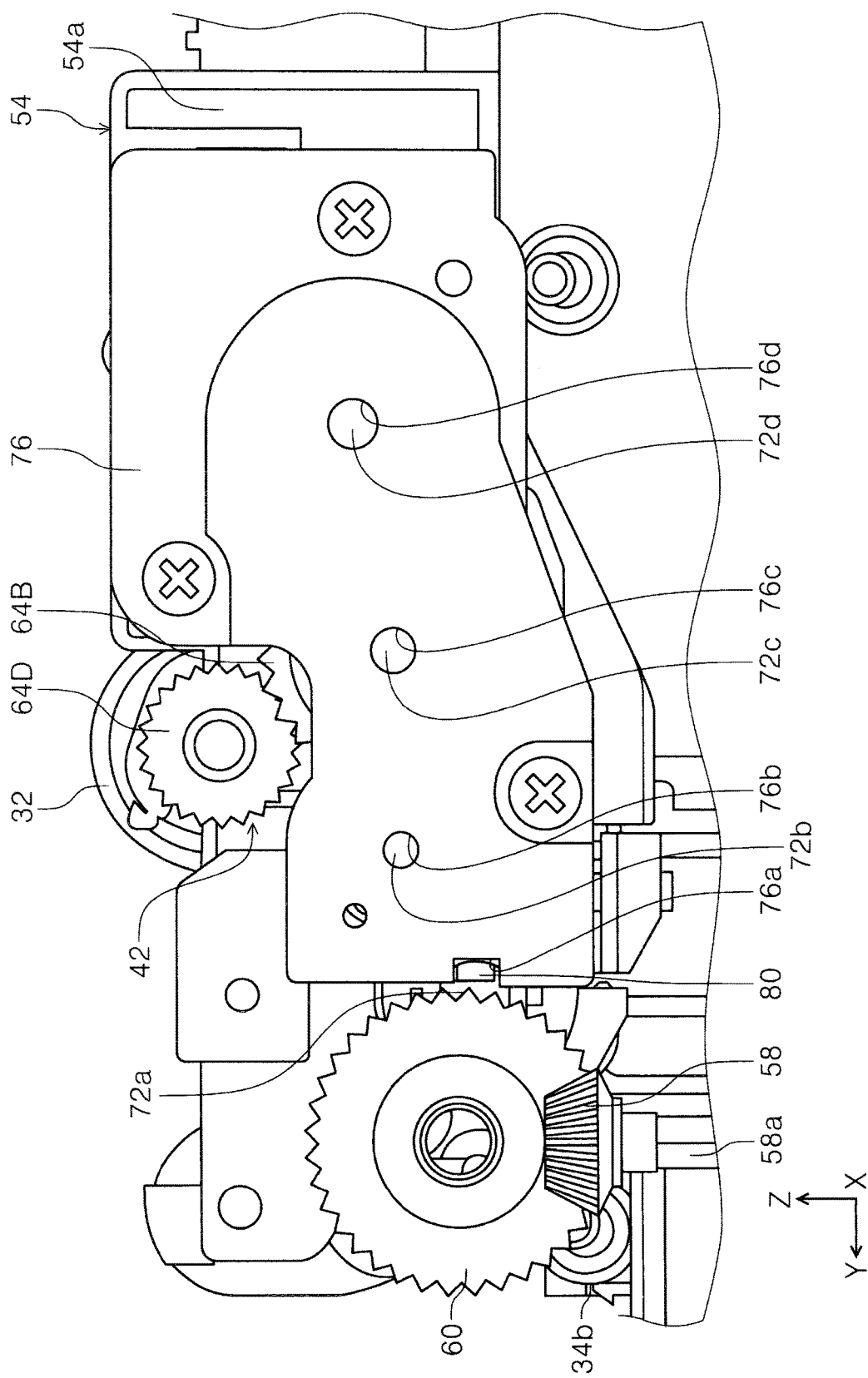
FIG. 12 is a side view illustrating the cover member that covers the first gear group in the route forming member.
Figure 13:
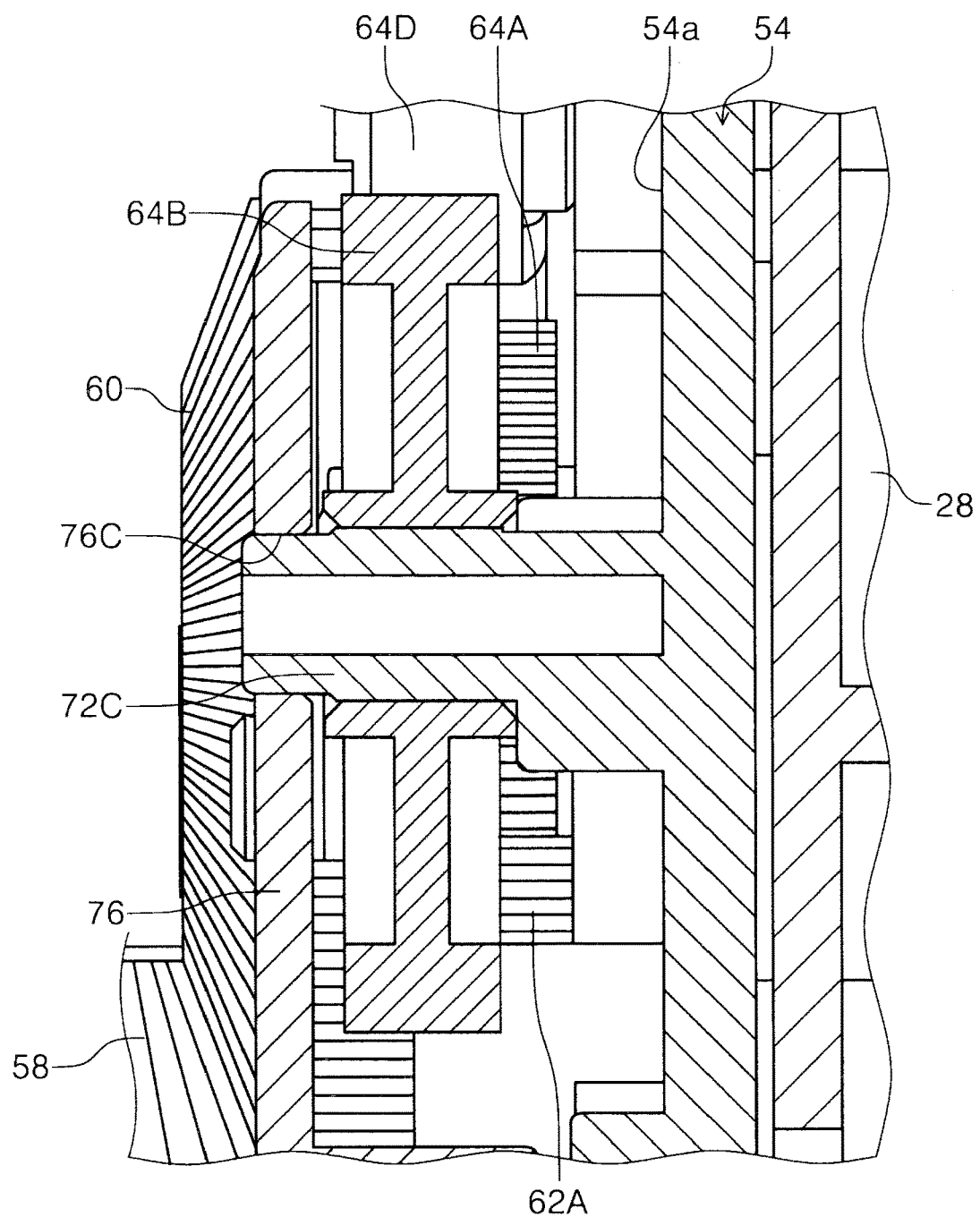
FIG. 13 is a side sectional view illustrating a relationship between a shaft of a gear and the cover member.
Figure 14:
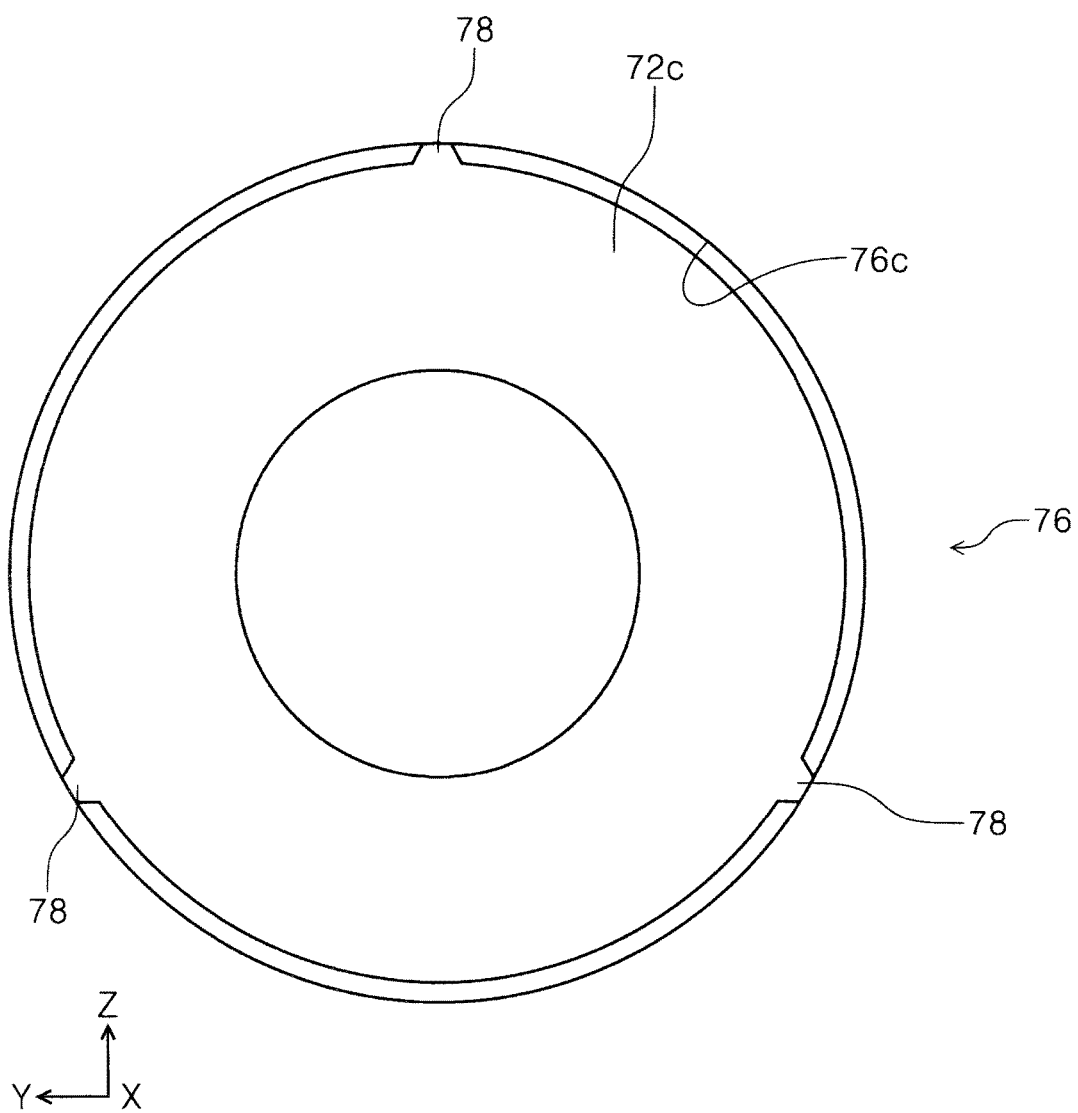
FIG. 14 is a sectional view illustrating a shaft supporting portion provided in the cover member.
Figure 15:
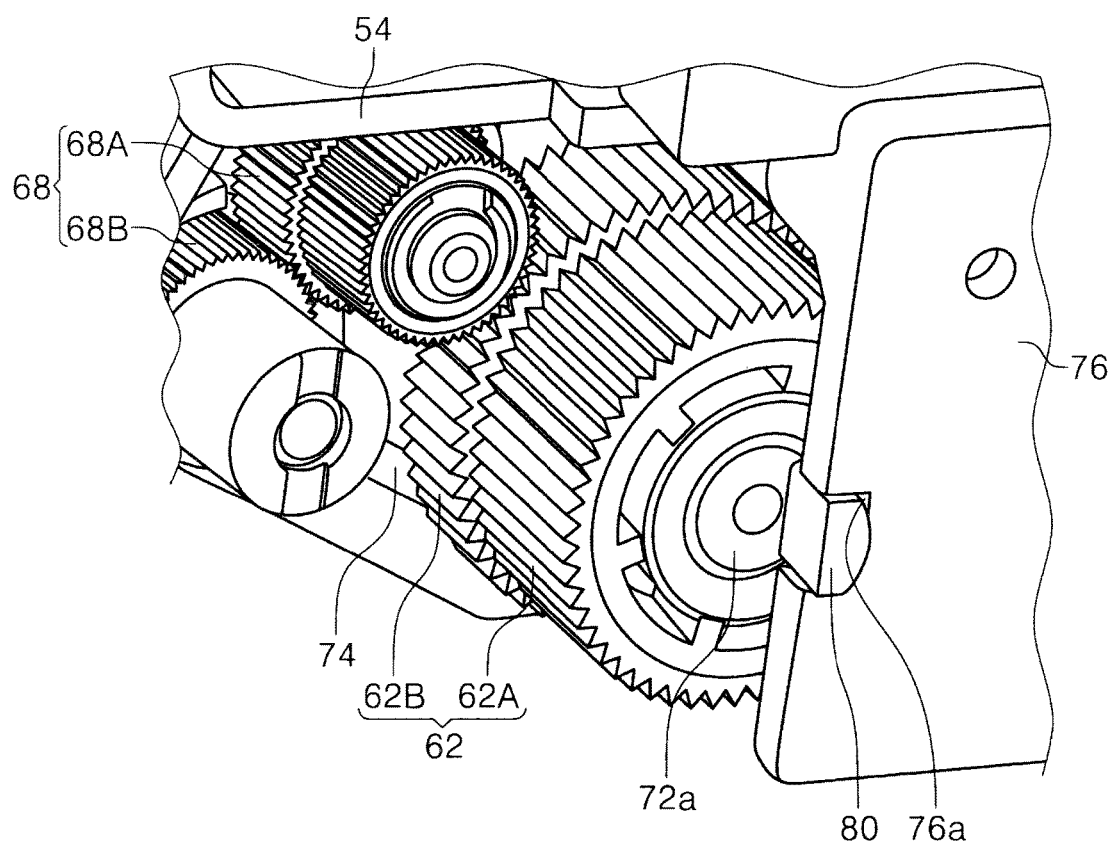
FIG. 15 is a perspective view illustrating a relationship between an input gear and the shaft supporting portion provided in the cover member.

FIG. 11 is a perspective view illustrating a cover member that covers a first gear group in the route forming member, FIG. 12 is a side view illustrating the cover member that covers the first gear group in the route forming member, FIG. 13 is a side sectional view illustrating a relationship between a shaft of a gear and the cover member, FIG. 14 is a sectional view illustrating a shaft supporting portion provided in the cover member, and FIG. 15 is a perspective view illustrating a relationship between an input gear and the shaft supporting portion provided in the cover member.

Figure 16:
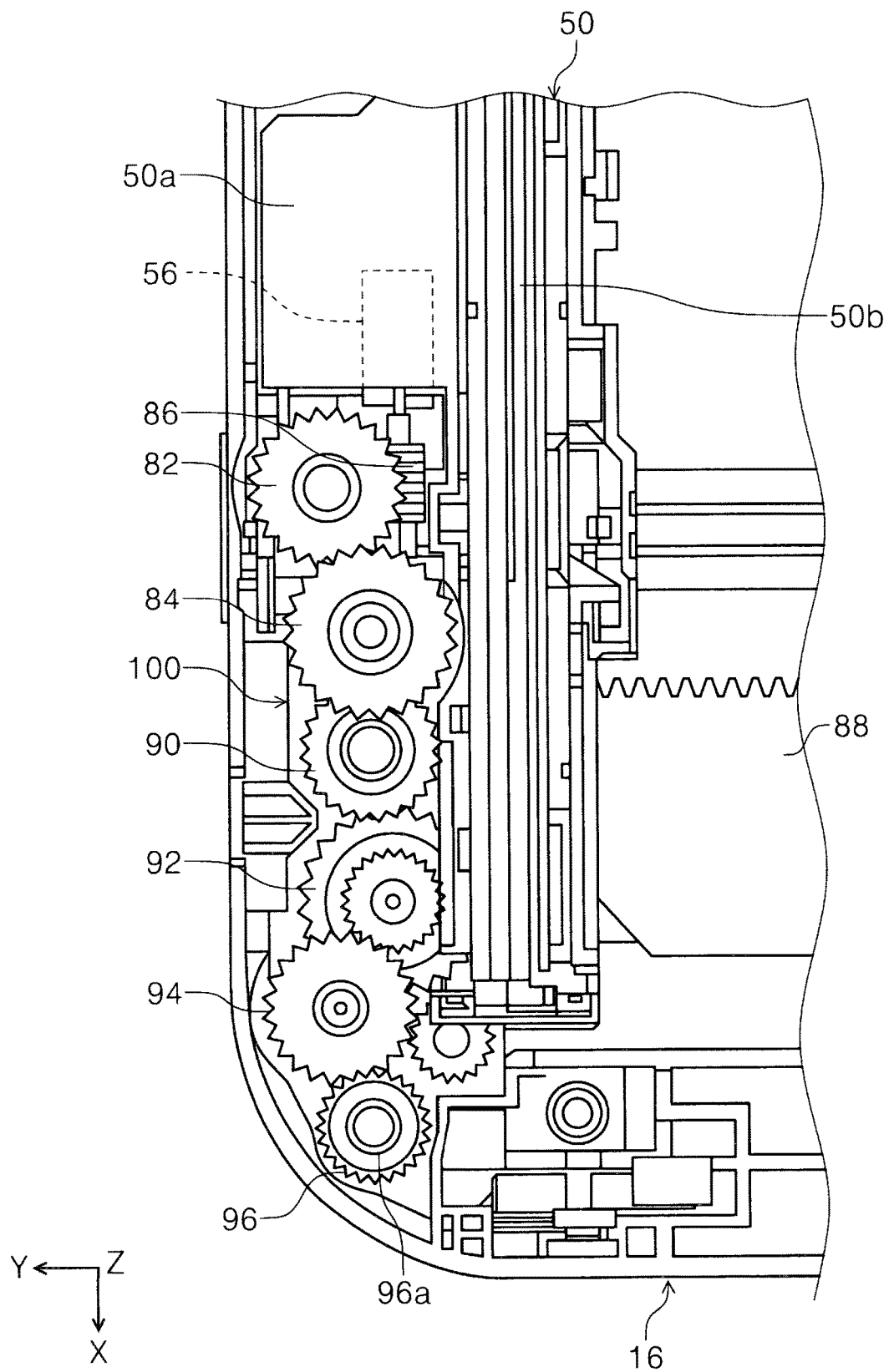
FIG. 16 is a plan view illustrating a transmission route of drive power to a drive motor provided in the device main body and the power transmission unit.
Figure 17:
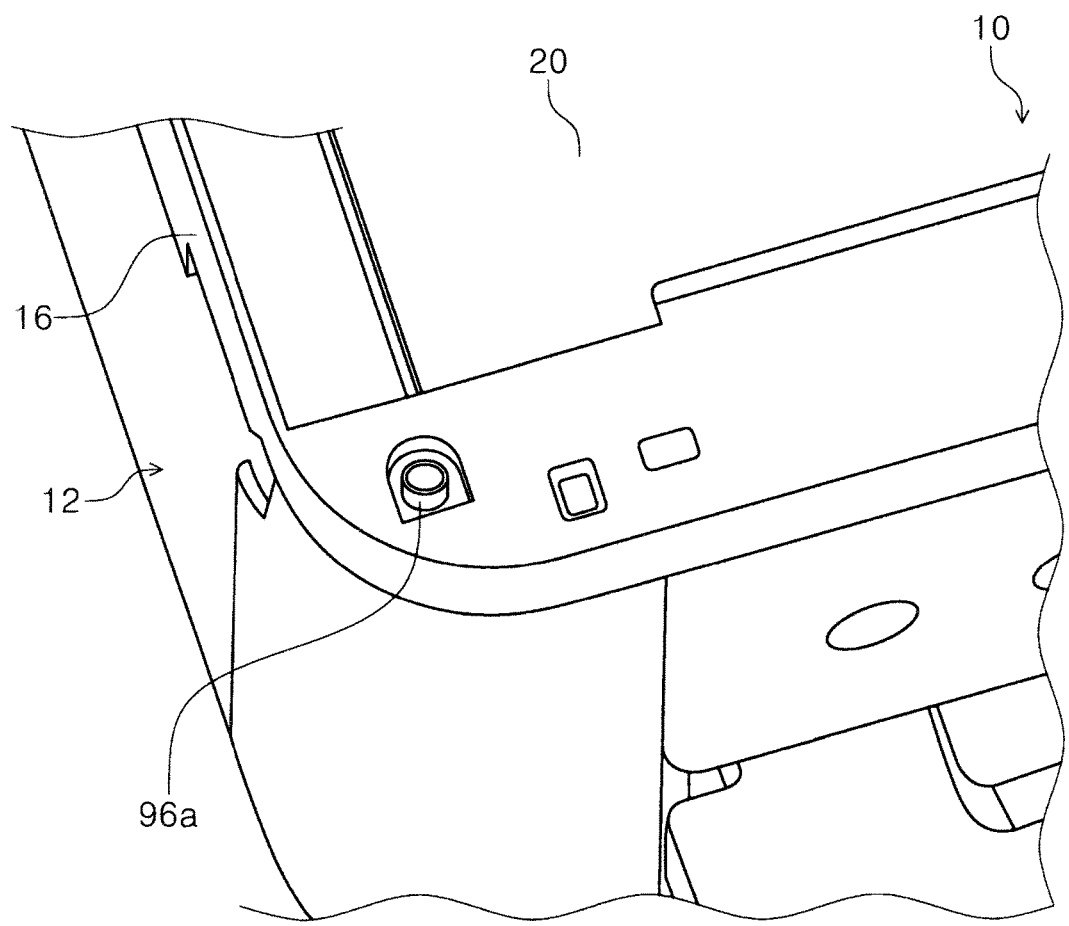
FIG. 17 is a perspective view illustrating a connection target portion provided on an upper surface of the device main body.
Figure 18:
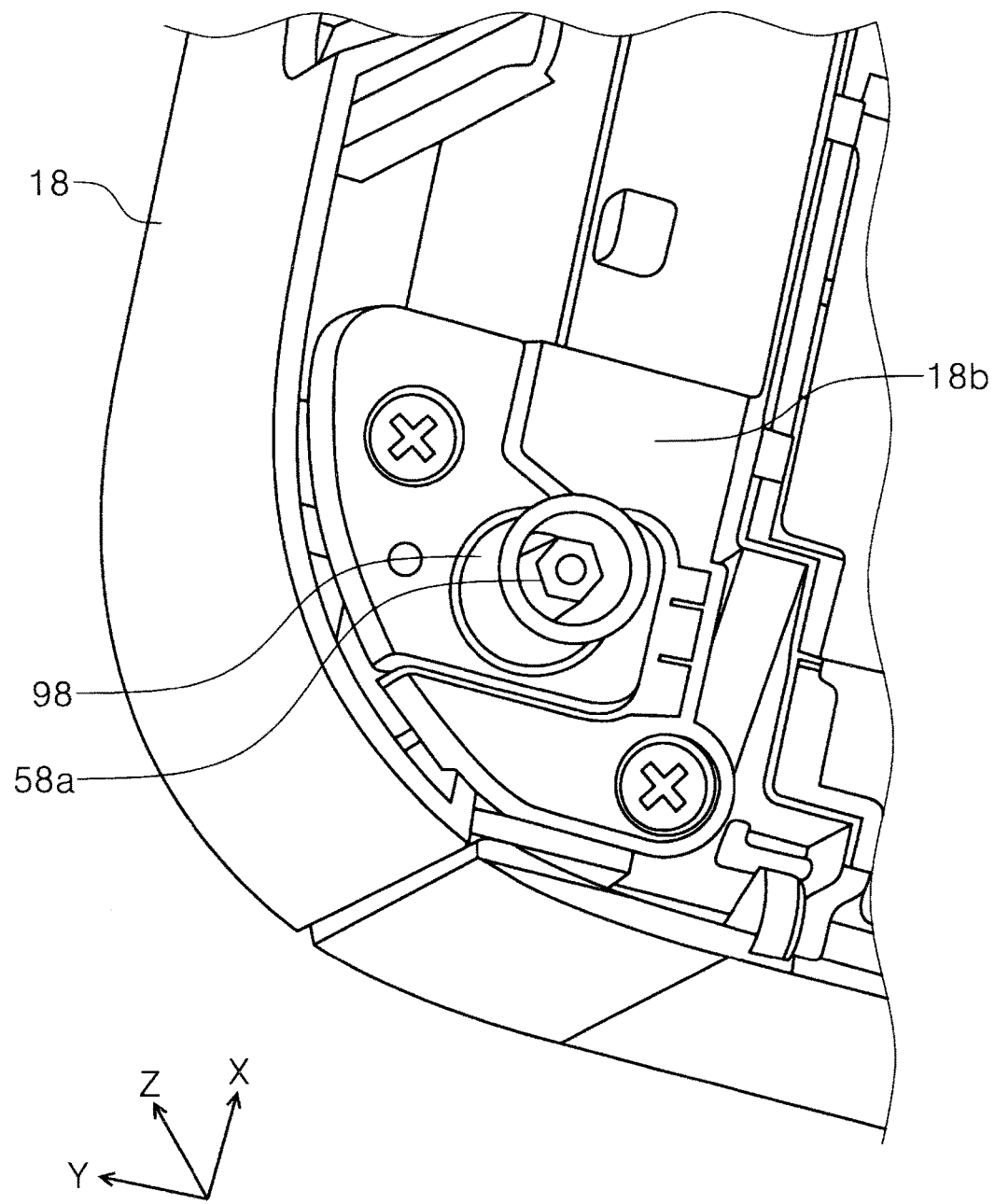
FIG. 18 is a perspective view illustrating a connection portion provided on a lower surface of the document transportation device.
Figure 19:
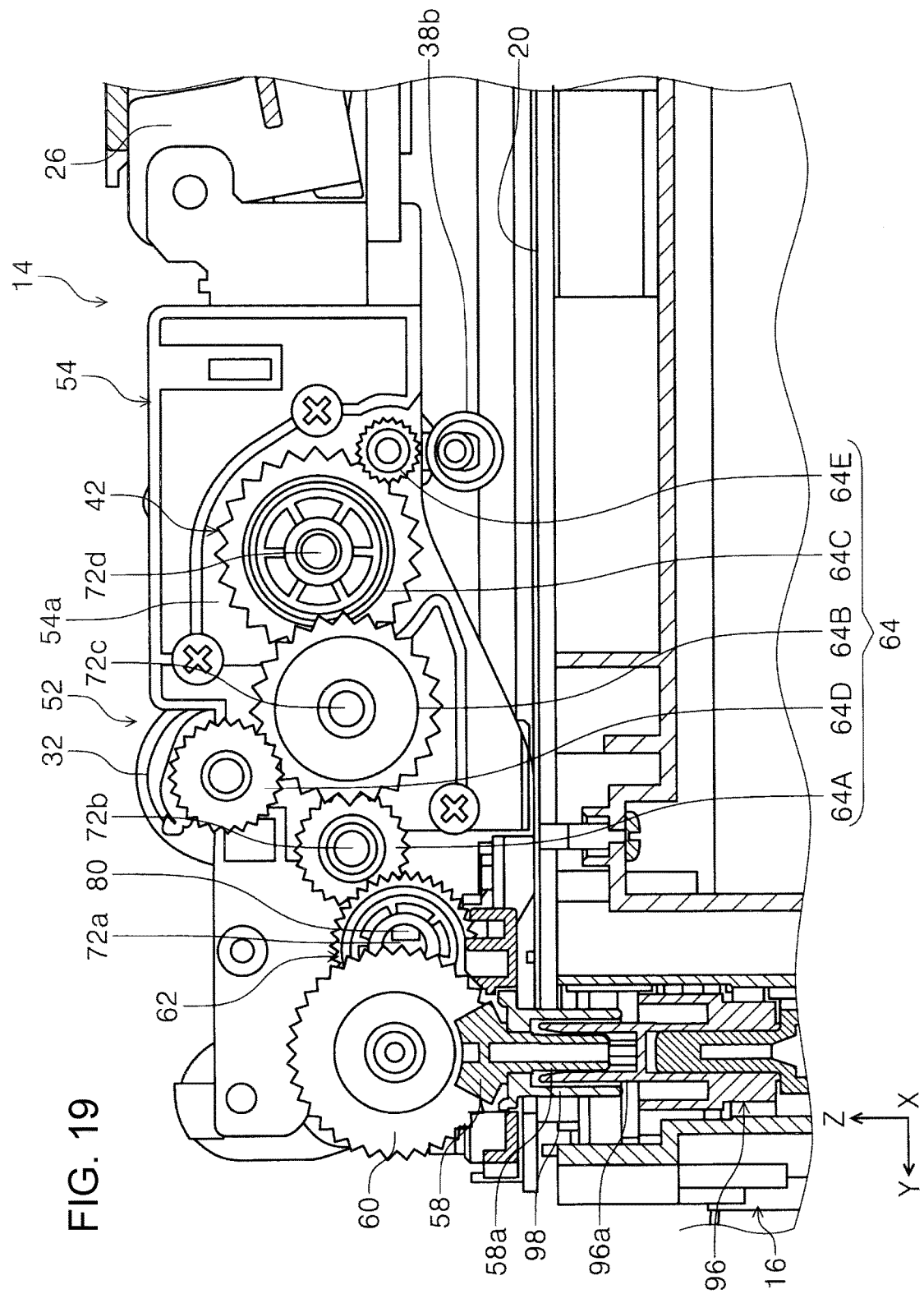
FIG. 19 is a side sectional view illustrating a state where the document transportation device is closed with respect to the device main body and the connection portion and the connection target portion are connected to each other.

FIG. 16 is a plan view illustrating a transmission route of drive power to a drive motor provided in the device main body and the power transmission unit, FIG. 17 is a perspective view illustrating a connection target portion provided on an upper surface of the device main body, FIG. 18 is a perspective view illustrating a connection portion provided on a lower surface of the document transportation device, and FIG. 19 is a side sectional view illustrating a state where the document transportation device is closed with respect to the device main body and the connection portion and the connection target portion are connected to each other.

In addition, in an X-Y-Z coordinate system in each drawing, an X direction is a width direction of a document, that is, a device depth direction, a Y direction is a transportation direction of the document in the transportation route in the image reading device, that is, a device width direction, and a Z direction is a device height direction.

FIRST EXAMPLE

Outline of Printer

In FIG. 1, the entire configuration of a printer 10 will be described. The printer 10 is configured as an ink jet printer as an example of a recording device. The printer 10 is configured as a multifunction machine provided with a recording device section 12 and an image reading device 14. The image reading device 14 is configured as a scanner unit, for example.

In this example, the image reading device 14 is rotatably connected to a rear surface side end portion of the recording device section 12 in the device depth direction. Although not shown in the drawings, when the image reading device 14 is rotated toward a device rear surface side, an upper portion of the recording device section 12 is exposed. The image reading device 14 is provided with a device main body 16 and a document transportation device 18. In this example, the document transportation device 18 is configured as an auto document feeder (ADF), for example.

In FIG. 2, the document transportation device 18 is rotatably connected to a rear surface side end portion of the device main body 16 in the device depth direction and when the document transportation device 18 is rotated toward the device rear surface side, a document mounting table 20 as a "mounting table", which is provided on an upper portion of the device main body 16, is exposed so that it is possible to set a document as a "medium" on the document mounting table 20. The document mounting table 20 is configured with a glass plate that is transparent and flat. Note that, an example of the "document" in this example is a document such as a photograph or a written document.

In FIGS. 1 and 3, an upper portion of the document transportation device 18 is provided with a cover portion 22 and a discharge tray 24. The cover portion 22 and the discharge tray 24 are attached such that the cover portion 22 and the discharge tray 24 can rotate relative to the document transportation device 18 and the cover portion 22 and the discharge tray 24 are configured such that it is possible to switch between a non-feeding state (FIG. 1) and a feeding state (FIG. 3). In the non-feeding state, the cover portion 22 and the discharge tray 24 are in a posture along a Y axis direction and an X axis direction and constitute a portion of an upper surface 18a of the document transportation device 18. Therefore, the upper surface 18a of the document transportation device 18 can form a flat surface and thus the aesthetic appearance of the device is improved.

In FIG. 3, when the state of the cover portion 22 and the discharge tray 24 is switched from the non-feeding state to the feeding state, a document supporting portion 26 as a "medium supporting portion" is exposed. It is possible to set a plurality of documents on the document supporting portion 26 and the document supporting portion 26 supports a document to be fed together with the cover portion 22 in the feeding state.

Document Transportation Path

In FIG. 4, a document transportation path 28 will be described. Note that, in FIG. 4, a two-dot chain line with a reference symbol P represents a transportation route of a document transported along the document transportation path 28. In the document transportation path 28, on the downstream side of the document supporting portion 26 in a transportation direction, a feeding roller 30, a separation roller 32, a pair of transportation rollers 34, a reading unit 36 and a pair of discharging rollers 38 are arranged in this order. Note that, in this example, a route from the separation roller 32 to the pair of transportation rollers 34 in the document transportation path 28 is configured as a curved inversion route 40.

In this example, the feeding roller 30 is configured to rotate when receiving power from a first power transmission route 42, which will be described later. In this example, a driven roller 44 is provided at a position facing the feeding roller 30. The driven roller 44 is configured to be capable of rotating in accordance with rotation of the feeding roller 30. The driven roller 44 is provided in order to reduce friction between the feeding roller 30 and a facing surface which occurs when the feeding roller 30 continues to rotate while there is no document to be fed by the feeding roller 30. As a result, it is possible to reduce the influence of a transportation load on a read image.

A separation pad 46 is provided at a position facing the separation roller 32. The separation pad 46 abuts onto the separation roller 32. The separation pad 46 is formed of, for example, a high-friction material. A plurality of documents fed by the feeding roller 30 are separated by the separation roller 32 and the separation pad 46 and only a document being in contact with the separation roller 32 is transported to the pair of transportation rollers 34 which is disposed on the downstream side in a document transportation direction. Note that, when a document is transported from the separation roller 32 to the pair of transportation rollers 34, that is, when the document passes through the curved inversion route 40, the document is curved and inverted.

The pair of transportation rollers 34 is provided with a transportation roller 34a and a driven roller 34b. The transportation roller 34a is configured to be driven while receiving power from a second power transmission route 48, which will be described later. The driven roller 34b is configured to be capable of rotating in accordance with rotation of the transportation roller 34a.

On the downstream side of the pair of transportation rollers 34, the reading unit 36 is provided. A document fed to the reading unit 36 by the pair of transportation rollers 34 is read by a reader 50, which is provided at a position facing the document with the document mounting table 20 interposed therebetween. The document read by the reader 50 on the document mounting table 20 is transported to the pair of discharging rollers 38 provided on the downstream side of the reading unit 36 in the document transportation path 28 and is discharged to the discharge tray 24 by the pair of discharging rollers 38.

The pair of discharging rollers 38 is provided with a discharging roller 38a and a driven roller 38b. In this example, the discharging roller 38a is configured to be rotated while receiving power from the first power transmission route 42, which will be described later. The driven roller 38b is configured to be capable of rotating in accordance with rotation of the discharging roller 38a.

Power Transmission Unit

In FIGS. 5 and 6, a power transmission unit 52 will be described. In the document transportation device 18, the power transmission unit 52 is provided at a position close to a +Y axis direction side of a side portion 54a of a route forming member 54 that is on a +X axis direction side, the route forming member 54 forming the document transportation path 28 and the curved inversion route 40. The power transmission unit 52 is configured to transmit power of a drive motor 56 (FIG. 16) provided in the device main body 16 to the feeding roller 30, the transportation roller 34a, and the discharging roller 38a. Note that, a power transmission route from the drive motor 56 in the device main body to the power transmission unit 52 will be described later.

Specifically, the power transmission unit 52 is provided with a first bevel gear 58, a second bevel gear 60, an input gear 62, the first power transmission route 42, and the second power transmission route 48. For example, the first bevel gear 58 is provided in the document transportation device 18 with the axial direction thereof extending along a Z axis. The first bevel gear 58 is configured to rotate while receiving power of the drive motor 56 (FIG. 16). The second bevel gear 60 meshes with the first bevel gear 58. In this example, the second bevel gear 60 is configured as, for example, a composite gear. The second bevel gear 60 is provided with a spur gear and the spur gear is configured to mesh with the input gear 62.

Therefore, when the first bevel gear 58 rotates while receiving power from the drive motor 56 (FIG. 16), the second bevel gear 60 rotates and the input gear 62 also rotates. Here, in FIG. 6, the input gear 62 is provided at a position in the power transmission unit 52 such that the power is distributed to the first power transmission route 42 and the second power transmission route 48.

In this example, the input gear 62 is configured as a composite gear and is provided with a first input gear 62A that transmits the power to the first power transmission route 42 side and a second input gear 62B that transmits the power to the second power transmission route 48 side. Note that, the first input gear 62A meshes with the spur gear (not shown) of the second bevel gear 60 and is configured to receive the power from the drive motor 56 (FIG. 16).

First Power Transmission Route

The first power transmission route 42 is provided with a first gear group 64 including a plurality of gears. The first gear group 64 is provided with a first transmission gear 64A, a second transmission gear 64B, a third transmission gear 64C, a feeding roller driving gear 64D and a discharging roller driving gear 64E. The first transmission gear 64A meshes with the first input gear 62A. The second transmission gear 64B meshes with the first transmission gear 64A, the third transmission gear 64C, and the feeding roller driving gear 64D. The third transmission gear 64C meshes with the discharging roller driving gear 64E.

When the first input gear 62A rotates while receiving the power from the drive motor 56 (FIG. 16), the first transmission gear 64A, the second transmission gear 64B, and the third transmission gear 64C also rotate subsequently. Therefore, the feeding roller driving gear 64D meshing with the second transmission gear 64B also rotates in accordance with the rotation of the second transmission gear 64B. Here, the feeding roller driving gear 64D is attached to a +X direction side end portion of a rotation shaft 65. The separation roller 32 is attached to a −X direction side end portion of the rotation shaft 65 (FIG. 11). Furthermore, the feeding roller 30 is configured to receive the power from the rotation shaft 65 through a plurality of gear groups 67 provided on the −X direction side end portion of the rotation shaft 65. When the feeding roller driving gear 64D rotates, the feeding roller 30 (FIG. 11) is also driven to rotate through the rotation shaft 65.

Furthermore, when the third transmission gear 64C rotates, the discharging roller driving gear 64E meshing with the third transmission gear 64C is also driven to rotate. Here, in FIG. 8, the discharging roller 38a is attached to a rotation shaft 66. In this example, two discharging rollers 38a are provided on the rotation shaft 66 at an interval in the X axis direction. The discharging roller driving gear 64E is attached to a +X axis direction side end portion of the rotation shaft 66. When the discharging roller driving gear 64E rotates, the discharging roller 38a (FIG. 8) is also driven to rotate through the rotation shaft 66.

Second Power Transmission Route

Next, in FIG. 6, the second power transmission route 48 is provided with a second gear group 68 including a plurality of gears. The second gear group 68 is provided with a fourth transmission gear 68A and a transportation roller driving gear 68B. The second gear group 68 includes a smaller number of gears than the first gear group 64. The fourth transmission gear 68A meshes with the second input gear 62B. The transportation roller driving gear 68B meshes with the fourth transmission gear 68A. When the input gear 62 rotates, the transportation roller driving gear 68B meshing with the fourth transmission gear 68A is also driven to rotate through the fourth transmission gear 68A.

Here, in FIG. 8, the transportation roller 34a is attached to a rotation shaft 70. In this example, two transportation rollers 34a are provided on the rotation shaft 70 at an interval in the X axis direction. The transportation roller driving gear 68B is attached to a +X axis direction side end portion of the rotation shaft 70. When the transportation roller driving gear 68B rotates, the transportation roller 34a is also driven to rotate through the rotation shaft 70.

Note that, when the input gear 62 rotates in a predetermined direction (counter-clockwise direction in FIG. 6) while receiving the power from the drive motor 56 (FIG. 16), the feeding roller 30, the transportation roller 34a, and the discharging roller 38a rotate in a direction such that the document is fed along the document transportation path 28 from the upstream side to the downstream side.

Transportation Roller Driving Gear

In FIG. 7, the side portion 54a of the route forming member 54 that is on a +X direction side is provided with a plurality of shafts 72a, 72b, 72c, 72d, and 72e as "shaft portions" that protrude in the +X axis direction. The input gear 62 is attached to the shaft 72a and the shaft 72a supports the input gear 62. Similarly, the first transmission gear 64A is attached to the shaft 72b, the second transmission gear 64B is attached to the shaft 72c, the third transmission gear 64C is attached to the shaft 72d, the fourth transmission gear 68A is attached to the shaft 72e, and the shafts support the gears, respectively.

Furthermore, a recess portion 74 that is recessed in a −X axis direction is formed on the side portion 54a. The recess portion 74 is provided with the shaft 72a and the shaft 72e. In FIG. 8, the fourth transmission gear 68A attached to the shaft 72e and the transportation roller driving gear 68B are positioned closer to a −X direction side than the first transmission gear 64A, the second transmission gear 64B, and the third transmission gear 64C of the first gear group 64 in the X axis direction. That is, the second gear group 68 is positioned closer to the −X direction side than the first gear group 64.

Here, in FIG. 8, a two-dot chain line with a reference symbol X1 represents a +X direction side end portion of the document transportation path 28 (curved inversion route 40) in a document width direction (X axis direction). In this example, at least a portion of the transportation roller driving gear 68B is disposed inward of the two-dot chain line X1 in the X axis direction, that is, is disposed in the curved inversion route 40. As a result, the transportation roller driving gear 68B can transmit power (torque) to the transportation roller 34a at a position closer to the transportation roller 34a in the X axis direction and thus it is possible to suppress distortion of the rotation shaft 70.

In this example, the transportation roller driving gear 68B can be driven to rotate via only the fourth transmission gear 68A from the input gear 62. That is, since it is possible to drive and rotate the transportation roller 34a with a small number of gears, it is possible to reduce engagement of the gears, to reduce a load on the gears, and to suppress the influence of backlashes of the gears. Therefore, it is possible to increase the rotation accuracy of the transportation roller 34a. As a result, it is possible to increase the document feeding amount accuracy at the time of transportation of the document and it is possible to improve the document reading accuracy of the reading unit 36.

Particularly, in this example, the number of gears of the second gear group 68 is smaller than the number of gears of the first gear group 64 and thus it is possible to make the influence of a backlash of the transportation roller driving gear 68B smaller than the influence of backlashes of the feeding roller driving gear 64D and the discharging roller driving gear 64E and to improve the transportation accuracy of the transportation roller 34a further than the other rollers.

In this example, the first gear group 64 is disposed outward of the two-dot chain line X1 in the X axis direction, that is, the first gear group 64 is disposed outside the document transportation path 28 (curved inversion route 40).

Note that, in this example, the length of the rotation shaft 70 of the transportation roller 34a is set to L1. Meanwhile, the length of the rotation shaft 66 of the discharging roller 38a is set to L2. In this example, the length L1 of the rotation shaft 70 is set to be larger than the length L2 of the rotation shaft 66.

A relationship between the first gear group 64, the second gear group 68, and the document transportation path (curved inversion route 40) as seen from the +X axis direction side in FIGS. 9 and 10 will be described. In FIG. 10, two-dot chain circles with reference symbols 62-1, 64A-1, 64B-1, 64C-1, 64D-1, and 64E-1 respectively represent the positions of the input gear 62, the first transmission gear 64A, the second transmission gear 64B, the third transmission gear 64C, the feeding roller driving gear 64D, and the discharging roller driving gear 64E provided on the side portion 54a of the route forming member 54 in FIG. 9.

As illustrated in FIG. 10, the fourth transmission gear 68A and the transportation roller driving gear 68B are disposed inside the curved inversion route 40 as seen from the +X axis direction side. Since the second gear group 68 is disposed by using a space inside the curved inversion route 40 of which a relatively large space can be used, it is possible to increase the outer diameters of the fourth transmission gear 68A and the transportation roller driving gear 68B of the second gear group 68 and to decrease the number of gears constituting the second gear group 68. As a result, it is possible to suppress the influence of backlashes of the gears and to suppress an increase in size of the device.

Meanwhile, at least a portion of the first transmission gear 64A, the second transmission gear 64B, and the third transmission gear 64C constituting the first gear group 64 is disposed outside the document transportation path 28 as seen from the +X axis direction side. In this example, since the gears 64A, 64B, and 64C constituting the first gear group 64 are disposed on the side portion 54a of the route forming member 54 that is positioned outside the document transportation path 28 in the X axis direction, the diameters of the first transmission gear 64A, the second transmission gear 64B, and the third transmission gear 64C can be larger in comparison with a case where the gears are provided in the document transportation path 28.

As a result, it is possible to decrease the number of gears in an area from the input gear 62 to the feeding roller driving gear 64D and to decrease the number of gears in an area from the input gear 62 to the discharging roller driving gear 64E. Accordingly, it is possible to decrease the number of components such that cost reduction is achieved and since it is possible to reduce engagement of the gears, it is possible to reduce a load on the gears and to suppress the influence of backlashes of the rollers.

Furthermore, since it is possible to configure the first gear group 64 and the second gear group 68 with a small number of gears, it is possible to simplify assembly of the power transmission unit 52 and to improve the workability in an assembling operation.

A summary of the above-described configuration is as follows. A torque of the drive motor 56 is transmitted to a roller of which the transportation accuracy needs to be high, that is, the transportation roller 34a from a deep position in the device (position inside document transportation region) and distortion of the shaft can be suppressed. Furthermore, since the above-described position is inside the curved inversion route 40 (region at which document transportation route is expanded most), the dimensions of the device (particularly, height dimension) are not increased even when the diameters of the gears are maximized. In addition, it is possible to suppress the influence of a backlash by increasing the diameters of the gears.

In addition, the first power transmission route 42 is on the outside of the curved inversion route, the first power transmission route 42 transmitting power to a roller that is not likely to influence the reading accuracy even when the transportation accuracy thereof is somewhat lower than that of the transportation roller 34a, that is, the discharging roller 38a. Therefore, it is possible to maximize the diameters of the gears and to suppress the influence of a backlash and it is possible to suppress an increase in size of the device since the outer diameters of the gears are set such that the gears do not stick out of the route forming member 54 as a whole in a vertical direction as illustrated in FIGS. 5 and 10.

Cover Member

Next, in FIGS. 11 to 15, a cover member 76 will be described. In FIGS. 11 and 12, the cover member 76 is attached to the side portion 54a such that the cover member 76 covers the input gear 62 and at least a portion of the first gear group 64 on the side portion 54a of the route forming member 54.

Here, when the document is jammed in the document transportation path 28 of the document transportation device 18, a portion of the document transportation path 28 is opened and exposed in some cases in order to remove the jammed document. In this example, even in a state where a portion of the document transportation path 28 is exposed (not shown), the cover member 76 covers a large number of gears constituting the first gear group 64 as illustrated in FIG. 11. Therefore, it is possible to restrain a user from accessing the gears carelessly.

The cover member 76 is provided with shaft supporting portions 76a, 76b, 76c, and 76d. In this example, the shaft supporting portion 76a supports the shaft 72a that supports the input gear 62, the shaft supporting portion 76b supports the shaft 72b that supports the first transmission gear 64A, the shaft supporting portion 76c supports the shaft 72c that supports the second transmission gear 64B, and the shaft supporting portion 76d supports the shaft 72d that supports the third transmission gear 64C.

First, the configurations of the shaft supporting portions 76b, 76c, and 76d in FIGS. 12 to 14 will be described. In this example, the shaft supporting portions 76b, 76c, and 76d are configured as through-holes provided in the cover member 76. In FIG. 13, referring to a relationship between the shaft 72c and the shaft supporting portion 76c as an example, a tip end of the shaft 72c is inserted into the shaft supporting portion 76c having a through-hole-like shape.

In FIG. 14, the shaft 72c is provided with protruding portions 78 that protrude in a radial direction of the shaft 72c while being arranged at appropriate intervals in a circumferential direction. In this example, for example, three protruding portions 78 are provided. The protruding portions 78 abut onto the shaft supporting portion 76c in a state where the shaft 72c is inserted into the shaft supporting portion 76c. Accordingly, the shaft supporting portion 76c can support the shaft 72c with the shaft 72c not wobbling. Note that, the shafts 72b and 72d are also provided with the protruding portions 78 so that the shaft supporting portions 76b and 76d can support the shafts 72b and 72d with the shafts 72b and 72d not wobbling, as with the shaft supporting portion 76c.

Next, in FIGS. 12 and 15, a relationship between the shaft 72a and the shaft supporting portion 76a will be described. In FIG. 15, a protrusion 80 that protrudes in the +X axis direction is formed on a tip end portion of the shaft 72a. The protrusion 80 is formed on a portion of the shaft 72a such that the protrusion 80 does not interfere with the second bevel gear 60 in a state where the power transmission unit 52 is assembled as illustrated in FIG. 12. Specifically, in FIG. 12, the protrusion 80 is formed on a −Y direction side end portion of the shaft 72a.

The shaft supporting portion 76a is formed as a recess portion of the +Y direction side end portion of the cover member 76, the recess portion being recessed toward the −Y direction side. The shaft supporting portion 76a is formed to have a size such that the protrusion 80 of the shaft 72a can be accommodated therein and the protrusion 80 is accommodated in the shaft supporting portion 76a. Accordingly, the shaft supporting portion 76a restricts displacement of the protrusion 80 in the −Y direction, a +Z direction, and a −Z direction and supports the protrusion 80 and the shaft 72a.

Here, when the document is jammed while being transported in the document transportation path 28 and at least one of the feeding roller 30, the transportation roller 34a, and the discharging roller 38a enters a locked state (state where one of feeding roller 30, transportation roller 34a, and discharging roller 38a does not rotate), the input gear 62 also enters a locked state in some cases. When the second bevel gear 60 continues to rotate (rotate in clockwise direction in FIG. 5) while receiving the power from the drive motor 56 (FIG. 16) in this state, a load in a −YZ direction from the second bevel gear 60 is applied to the input gear 62, for example.

The shaft 72a tends to be deformed in the −YZ direction when the load in the −YZ direction is applied to the input gear 62. However, since the protrusion 80 is supported by the shaft supporting portion 76a, the deformation of the shaft 72a can be suppressed or reduced.

Power Transmission Route from Device Main Body to Document Transportation Device Next, in FIGS. 16 to 19, a power transmission route from the device main body 16 side to the document transportation device 18 side will be described. In FIG. 16, the reader 50 is provided in the device main body 16. For example, the reader 50 is configured to be capable of moving along the Y axis direction by means of a rack and pinion mechanism. The reader 50 is provided with a carriage 50a. The carriage 50a is provided with a sensor 50b that extends in the X axis direction, the drive motor 56, a fifth transmission gear 82, and a pinion gear 84. The sensor 50b is configured as a contact image sensor module (CISM), for example. Note that, the length of the sensor 50b in the X axis direction corresponds to the length of the document mounting table 20 in the X axis direction.

A drive shaft of the drive motor 56 is provided with a drive gear 86 and the drive gear 86 meshes with the fifth transmission gear 82. The fifth transmission gear 82 meshes with the pinion gear 84. Here, when the drive motor 56 is driven to rotate such that the pinion gear 84 rotates in a clockwise direction in FIG. 16, the pinion gear 84 meshes with a rack 88 such that the reader 50 is moved in the −Y direction. Accordingly, the reader 50 is displaced in the Y axis direction such that the document mounted on the document mounting table 20 can be read.

In FIG. 16, when the drive motor 56 is driven to rotate such that the pinion gear 84 rotates in a counter-clockwise direction in FIG. 16 in a state where the reader 50 is positioned in a +Y direction side end portion inside the device main body 16, the reader 50 maintains a state of being positioned in the +Y direction side end portion inside the device main body 16 and the pinion gear 84 meshes with a sixth transmission gear 90 provided in the device main body 16. In the device main body 16, a seventh transmission gear 92 meshing with the sixth transmission gear 90, an eighth transmission gear 94 meshing with the seventh transmission gear 92, and a composite gear 96 meshing with the eighth transmission gear 94 are provided.

The composite gear 96 is provided with a tubular connection target portion 96a that protrudes upward (+Z direction). An inner circumferential surface of the tubular connection target portion 96a is provided with an uneven portion extending in a circumferential direction.

Meanwhile, in FIG. 18, a lower surface 18b of the document transportation device 18 is provided with a cylindrical guide portion 98 that protrudes in the −Z direction. In the cylindrical guide portion 98, a connection portion 58a formed on a lower end of the first bevel gear 58 is disposed. The connection portion 58a protrudes in the −Z direction from the first bevel gear 58 and is formed as a rod-shaped portion having a polygonal shape, for example.

In FIG. 19, when the document transportation device 18 is closed with respect to the device main body 16, the connection target portion 96a is inserted into the cylindrical guide portion 98. Then, the rod-shaped connection portion 58a is inserted into the cylindrical connection target portion 96a. Here, when the connection portion 58a is inserted into the connection target portion 96a, the polygonal connection portion 58a engages with the uneven portion in the connection target portion 96a.

As a result, the composite gear 96 and the first bevel gear 58 can integrally rotate with each other. When the composite gear 96 rotates in the counter-clockwise direction in FIG. 16 by means of the power of the drive motor 56, the first bevel gear 58 also rotates in the same direction. Accordingly, the power of the drive motor 56 is transmitted to the first bevel gear 58 and the power is transmitted to the power transmission unit 52. Note that, in this example, the plurality of gears of the fifth transmission gear 82 to the composite gear 96 constitute a third power transmission route 100 (FIG. 16) through which power from the drive motor 56 is transmitted to the power transmission unit 52 provided in the document transportation device 18.

Modification Example of Example

In this example, a configuration, in which the power of the drive motor 56 (FIG. 16) is transmitted to the transportation roller driving gear 68B (FIG. 6) through the first bevel gear 58 (FIG. 5), the second bevel gear 60 (FIG. 5), the input gear 62 (FIGS. 5 and 6), and the fourth transmission gear 68A (FIG. 6) in a case where the composite gear 96 rotates in the counter-clockwise direction in FIG. 16, is adopted. However, instead of the above-described configuration, for example, a configuration in which, the composite gear 96 rotates in the clockwise direction in FIG. 16 as well while receiving the power of the drive motor 56, may be adopted. In this case, it is possible to adopt a configuration in which the transportation roller driving gear 68B directly meshes with the second input gear 62B without providing the fourth transmission gear 68A of the second gear group 68. As a result, it is possible to further reduce the number of gears of the second gear group 68.

A summary of the above description is as follows. The image reading device 14 includes the document supporting portion 26 that supports a document to be fed, the curved inversion route 40 in which the document fed from the document supporting portion 26 is curved and inverted, the reader 50 that reads the document having passed through the curved inversion route 40, the transportation roller 34a that is disposed in the curved inversion route 40 and transports the document to the reader 50, the discharging roller 38a that is provided on the downstream side of the reader 50 and discharges the document read by the reader 50, and the power transmission unit 52 that transmits the power of the drive motor 56 to the transportation roller 34a and the discharging roller 38a. The power transmission unit 52 is configured to include a plurality of gears and the plurality of gears include the input gear 62 that is provided at a branching position at which the power transmission route branches into the first power transmission route 42 toward the discharging roller 38a side and the second power transmission route 48 toward the transportation roller 34a side and that transmits the power of the drive motor 56 to the first power transmission route 42 and the second power transmission route 48, the first gear group 64 that constitutes the first power transmission route 42, and the second gear group 68 that constitutes the second power transmission route 48 and that is configured to include a smaller number of gears than the first gear group 64. The second gear group 68 includes the transportation roller driving gear 68B that is provided on the rotation shaft 70 of the transportation roller 34a and is disposed inside the curved inversion route 40 as seen from the X axis direction which is the document width direction intersecting the Y axis direction which is the document transportation direction and at least a portion of the transportation roller driving gear 68B is positioned inside a document transportation region, that is, the curved inversion route 40 in the X axis direction which is the document width direction.

According to the above-described configuration, since the second gear group 68 that transmits the power from the input gear 62 driven by the drive motor 56 to the transportation roller 34a is configured to include a smaller number of gears than the first gear group 64 that transmits the power from the input gear 62 to the discharging roller 38a in a configuration in which the power of the drive motor 56 is transmitted to the transportation roller 34a and the discharging roller 38a by means of the power transmission unit 52, it is possible to make the influence of backlashes of the gears at the time of driving the transportation roller 34a smaller than that of the discharging roller 38a and to prioritize the transportation accuracy of the transportation roller 34a of which the influence on the reading accuracy is great.

In addition, at least a portion of the transportation roller driving gear 68B provided on the rotation shaft 70 of the transportation roller 34a is positioned inside a medium transportation region, that is, the curved inversion route 40. Accordingly, a distance between a position from which a torque is transmitted with respect to the rotation shaft 70 of the transportation roller 34a and the transportation roller 34a is shortened and thus it is possible to suppress distortion of the rotation shaft 70 and to suppress a decrease in transportation accuracy of the transportation roller 34a.

Furthermore, the second gear group 68 that can transmit a drive power to the transportation roller 34a is disposed inside the curved inversion route 40, that is, the second gear group 68 is disposed by using a space inside the curved inversion route 40 of which a relatively large space can be used. Therefore, it is possible to avoid an increase in size of the device even when the outer diameters of the gears are secured in order to suppress the influence of backlashes of the gears.

Accordingly, it is possible to provide the image reading device 14 configured in consideration of both of improvement in transportation accuracy of the transportation roller 34a and suppression of an increase in size of the device.

The image reading device 14 is provided with the feeding roller 30 that feeds the document from the document supporting portion 26, and the power of the drive motor 56 is transmitted to the feeding roller 30 through the first power transmission route 42.

The first gear group 64 is positioned outside the document transportation path 28 (curved inversion route 40) in the X axis direction which is the document width direction. According to this configuration, since the document transportation path 28 is less restricted in comparison with a case where the gears of the first gear group 64 are provided in the document transportation path 28, it is possible to increase the diameters of the gears constituting the first gear group 64 and it is possible to suppress a decrease in transportation accuracy which is caused by backlashes of the gears.

In addition, in this example, the rotation shaft 70 of the transportation roller 34a is shorter than the rotation shaft 66 of the discharging roller 38a.

In addition, in this example, the image reading device 14 is provided with the route forming member 54 that forms the curved inversion route 40 and supports the first gear group 64 and the second gear group 68 with the side portion 54a, the recess portion 74 is formed in the side portion 54a of the route forming member 54, and the recess portion 74 is provided with the second gear group 68.

In addition, in this example, the image reading device 14 is provided with the cover member 76 that covers the input gear 62 and at least a portion of the first gear group 64, the route forming member 54 is provided with the shaft 72a that supports the input gear 62, and the cover member 76 is provided with the shaft supporting portion 76a that supports a free end (protrusion 80) of the shaft 72a.

According to this configuration, since the image reading device 14 is provided with the cover member 76 that covers the input gear 62 and at least a portion of the first gear group 64, it is possible to restrain a user from touching the gears carelessly. Furthermore, since the cover member 76 is provided with the shaft supporting portion 76a that supports the free end (protrusion 80) of the shaft 72a supporting the input gear 62, it is possible to appropriately support the input gear 62 by suppressing deformation of the shaft 72a.

The image reading device 14 is provided with the device main body 16 that is provided with the document mounting table 20 on which the document is mounted and the reader 50 and the document transportation device 18 that is provided to be capable of being opened and closed with respect to the device main body 16 and that transports the document to a reading region on the document mounting table 20. The document supporting portion 26, the curved inversion route 40, the transportation roller 34a, the discharging roller 38a, and the power transmission unit 52 constitute the document transportation device 18. The drive motor 56 is provided in the device main body 16 and is used as a driving source for moving the reader 50 with respect to the document mounting table 20. The image reading device 14 includes the third power transmission route 100 that is configured such that a transmission route of a drive power from the drive motor 56 to the power transmission unit 52 is formed in a state where the document transportation device 18 is closed with respect to the device main body 16.

According to this configuration, since the drive motor 56 is used for the purpose of driving the document transportation device 18 and the purpose of driving the reader 50, it is possible to reduce the cost of the device.

Note that, the invention is not limited to the above examples, various modifications can be made within the scope of the invention described in claims, and it is needless to say that such various modifications are also included within the scope of the invention.

The entire disclosure of Japanese Patent Application No. 2017-086949, filed Apr. 26, 2017 is expressly incorporated by reference herein.

What is claimed is:

1. An image reading device comprising:
   a medium supporting portion that supports a medium to be fed;
   a curved inversion route in which the medium fed from the medium supporting portion is curved and inverted;
   a reader that reads the medium having passed through the curved inversion route;
   a transportation roller that is disposed in the curved inversion route and transports the medium to the reader;
   a discharging roller that is provided on a downstream side of the reader and discharges the medium read by the reader; and
   a power transmission unit that transmits power of a driving source to the transportation roller and the discharging roller,
   wherein the power transmission unit is configured to include a plurality of gears,
   wherein the plurality of gears include
      an input gear that is provided at a branching position at which a power transmission route branches into a first power transmission route towards the discharging roller side and a second power transmission route towards the transportation roller side and that transmits the power of the driving source to the first power transmission route and the second power transmission route,
      a first gear group that constitutes the first power transmission route, and
      a second gear group that constitutes the second power transmission route and that is configured to include a smaller number of gears than the first gear group,
   wherein the second gear group includes a transportation roller driving gear that is provided on a rotation shaft of the transportation roller and is disposed inside the curved inversion route as seen from an axial direction of the rotation shaft, and
   wherein at least a portion of the transportation roller driving gear is positioned inside a medium transportation region in a width direction of the medium.

2. The image reading device according to claim 1, further comprising:
   a feeding roller that feeds the medium from the medium supporting portion,
   wherein the power of the driving source is transmitted to the feeding roller through the first power transmission route.

3. The image reading device according to claim 1, wherein the first gear group is positioned outside a medium transportation route in a width direction of the medium.

4. The image reading device according to claim 1, wherein the rotation shaft of the transportation roller is shorter than a rotation shaft of the discharging roller.

5. The image reading device according to claim 1, further comprising:
a route forming member that forms the curved inversion route and supports the first gear group and the second gear group with a side portion,
wherein a recess portion is formed in the side portion of the route forming member, and
wherein the recess portion is provided with the second gear group.

6. The image reading device according to claim 5, further comprising:
a cover member that covers the input gear and at least a portion of the first gear group,
wherein the route forming member is provided with a shaft portion that supports the input gear, and
wherein the cover member is provided with a shaft supporting portion that supports a free end of the shaft portion.

7. The image reading device according to claim 1, further comprising:
a device main body that is provided with a mounting table on which a document is mounted and with the reader; and
a document transportation device that is provided to be opened and closed with respect to the device main body and that transports the document to a reading region on the mounting table,
wherein the medium supporting portion, the curved inversion route, the transportation roller, the discharging roller, and the power transmission unit constitute the document transportation device,
wherein the driving source is provided in the device main body and is used as a driving source for moving the reader with respect to the mounting table, and
wherein a transmission route of a drive power from the driving source to the power transmission unit is formed in a state where the document transportation device is closed with respect to the device main body.

* * * * *